US012027143B2

(12) United States Patent
Clissold

(10) Patent No.: US 12,027,143 B2
(45) Date of Patent: Jul. 2, 2024

(54) MUSICAL INSTRUMENT, AND PARTS AND MANUFACTURE THEREOF

(71) Applicant: NUVO INSTRUMENTAL (ASIA) LIMITED, Hong Kong (HK)

(72) Inventor: Maximilian Spencer Clissold, Hong Kong (HK)

(73) Assignee: NUVO INSTRUMENTAL (ASIA) LIMITED, Hong Kong (HK)

( * ) Notice: Subject to any disclaimer, the term of this patent is extended or adjusted under 35 U.S.C. 154(b) by 0 days.

(21) Appl. No.: 17/837,386

(22) Filed: Jun. 10, 2022

(65) Prior Publication Data

US 2022/0398999 A1 Dec. 15, 2022

(30) Foreign Application Priority Data

Jun. 11, 2021 (HK) .......................... 32021033010.8

(51) Int. Cl.
*G10D 9/04* (2020.01)
*G10D 7/10* (2006.01)

(52) U.S. Cl.
CPC ................ *G10D 9/04* (2013.01); *G10D 7/10* (2013.01)

(58) Field of Classification Search
CPC .................................. G10D 9/04; G10D 7/10
See application file for complete search history.

(56) References Cited

U.S. PATENT DOCUMENTS 2,302,914 A * 11/1942 Runyon .................. G10D 9/04 984/144
3,835,748 A * 9/1974 Olson ..................... G10D 9/04 84/452 P (Continued)

FOREIGN PATENT DOCUMENTS

JP S49107222 A 10/1974
JP S5067125 A 6/1975

(Continued)

OTHER PUBLICATIONS

Extended EP Search Report dated Oct. 19, 2022, EP App No. 22178268.3-1001—10 pages.

(Continued)

*Primary Examiner* — Robert W Horn
(74) *Attorney, Agent, or Firm* — Cozen O'Connor

(57) ABSTRACT

A valve block for a valve assembly of a wind musical instrument, said valve block comprising a monolithic structure having a plurality of parallel and linearly spaced apart valve bores extending at least partially therethrough and for receiving a corresponding plurality of valve pistons therein an air ingress port extending through the valve block from external of the valve block and providing fluid communication between external of the valve block and a first valve bore; an air outlet port extending through the valve block from external of the valve block and providing fluid communication between external of the valve block and a further valve bore; transverse connecting passageways for providing fluid communication between adjacent valve bores; and a plurality of pairs of tuning section ports with each pair extending through the valve block from external of the valve block and providing fluid communication between external of the valve block and a valve bore.

19 Claims, 22 Drawing Sheets

(56) References Cited

U.S. PATENT DOCUMENTS

| | | | | | |
|---|---|---|---|---|---|
| 4,516,464 | A * | 5/1985 | Hastings | G10D 7/10 984/135 |
| 9,396,711 | B2 * | 7/2016 | John | G10D 9/04 |
| 9,765,901 | B2 * | 9/2017 | Harper | F16K 31/086 |
| 2016/0086587 | A1 | 3/2016 | John et al. | |
| 2019/0189092 | A1 * | 6/2019 | Clissold | G10D 7/10 |
| 2022/0398999 | A1 * | 12/2022 | Clissold | G10D 9/04 |

FOREIGN PATENT DOCUMENTS

| | | | |
|---|---|---|---|
| JP | 2004354492 | A | 12/2004 |
| JP | 2016505892 | A | 2/2016 |
| WO | 02099782 | A1 | 12/2002 |
| WO | 2010107465 | A2 | 9/2010 |
| WO | 2014096754 | A2 | 6/2014 |

OTHER PUBLICATIONS

Notice of Reasons for Rejection dated May 23, 2023, for Japanese Application No. 22022-094130, 10 pages.

* cited by examiner

MUSICAL INSTRUMENT, AND PARTS AND MANUFACTURE THEREOF

TECHNICAL FIELD

The present invention relates to a musical instrument, and parts and manufacture thereof. More particularly, the present invention relates to a valved wind instrument, and parts and manufacture thereof.

BACKGROUND OF THE INVENTION

There exist many types of wind instruments, and such instruments typically require a player to force vibrating air into an air inlet opening, typically by way of a mouthpiece.

The length of the tube of the musical instrument determines the tone or pitch of the instrument. A particular tube length of a brass-type musical wind instruments, such as a bugle, allows a player to vary the tone from the bell of the instrument for several different harmonics, in order to play a piece of music or tune which requires the use of such notes.

However, in order to be able to provide a full chromatic scale over several octaves, it is necessary to be able to alter the overall length of the tube of the instrument such that a full chromatic scale can be played.

In the case of a slide trombone, the length of the instrument may be varied continuously, and in order to provide requisite intervals in order for a scale and notes to be played, it is necessary for a player to learn the relevant positions of the slide of the trombone, which is typically seven positions, and by utilizing a changing vibration in order to have different harmonics, can fulfill the requirements of the intervals for a chromatic scale.

By contrast, other instruments such as trumpets, comets, flugelhorns, French horns, tenor horns, tubas, euphoniums and the like, have finite lengths of tubing which can be utilized by way of valves, so as to alter the length of the tubing between the mouthpiece and the bell of the instrument, and typically utilize several metal tubing lengths in order to provide tone intervals in conjunction with harmonics, whereby the length of the tube of the instrument from the mouthpiece end to the bell pipe end of the instrument is altered by a player via different combinations of different tubing, such that an appropriate pitch or tone range is provided.

In order to alter the length of the tube of the instrument, the instrument includes a tuning assembly for increasing the length of the tube. The tuning assembly comprises a valve assembly and tuning sections.

In the valve assembly, there is a player-operable valve arrangement whereby movement of one or more player-operable valves increases the length of the tube of the instrument, which routes air flow through one or more further tubes which may be termed "tuning sections" whilst occluding others, so as to provide the requisite tube length of the instrument for a desired musical note. Such valves are comprised of a moveable valve member which is movable relative to a valve casing in which it is contained or housed.

Most valve-type brass instruments, such as trumpets, cornets, tubas, flugelhorns, euphoniums and the like, use linear-operable valves as a valve piston which move in a linear direction within a cylindrical housing responsive to a linear force from a player's finger movement. Then, the valve piston is returned to an initial state by way of a return spring.

In some other brass instruments, rotary valves may be used such as are utilized in a French horn, and are operable by key members, to move the rotary valve piston in a rotary direction within a cylindrical housing similarly so as to vary the length of the air passageway within the tubular body of the instrument during playing and thereby change the pitch of the instrument.

In order to be able to provide a chromatic scale, most valve type instruments, within a single pitch key, are typically provided with three valves, 1st, 2nd and 3rd valves usually directly operable by the index, middle, and ring fingers of a player.

In some instruments, there are mechanisms connected to valve pistons, with a radial offset mechanism, more typically with rotary valved instruments, such as French horns.

When a valve piston is moved from a first position to a second position, this effectively extends the overall length of the tube of the instrument by a certain predetermined amount of tubing which is a tuning section, in order to alter or lower the tone or frequency of instrument.

The third valve casing is in fluid communication with the second valve casing by way of a connecting pipe often termed a "knuckle", and the second valve casing is then in fluid communication with the first valve casing by way of a further connecting pipe or knuckle extending between the valve casings.

Each valve of the valve assembly has its own tuning section and as such, when the first valve is depressed the length of the tube of the instrument is increased in accordance with the length of the first valve tuning section, when the second valve is depressed the length of the tube of the instrument is increased by the length of the 2nd valve tuning section, and when the third valve is depressed by the player the length of the tube of the instrument is increased by the length of the third tuning section.

As such and in order to obtain the appropriate lengths of tubing so as to provide the chromatic intervals, combinations of valves are depressed in order to achieve such intervals. Within such three valved instruments, as is known, there are seven main positions or combinations, which in combination with the harmonics of each position, allows for multiple octaves of a chromatic scale to be provided by a player.

Linear and rotary valves tend to require a relatively high degree of precision to manufacture, and this includes machining of the curved metal surface of the valve piston or valve rotor, so as to ensure that openings of passageways located in and extending through the curved surface of the cylindrical valve body are able to align accurately with corresponding openings in the valve casing when the valve is rotated, so as to appropriately increase the tube length. Such precision machining of linear and rotary valves is also required to prevent air escaping from between the contact formed by the curved inner surface of the valve housing and the curved outer surface of the valve element, which can cause a loss in sound quality.

During assembly of the instrument, the valve casings are typically affixed relative to each other by way of spacer elements often termed "spanner brace" or "stays", which are soldered or braised to the outer surface of the valve casing walls, and the knuckles which engage with the valve tuning sections. The knuckles of the lead pipe and bell pipe are also brazed or soldered to the valve casings and may be affixed relative to each other also by way of spanner braces stays extending between the tuning sections and lead pipe and bell pipe, so as to provide a secure structure.

OBJECT OF THE INVENTION

It is an object of the present invention to provide a musical instrument, and parts and manufacture thereof. More particularly, the present invention provides a valved wind instrument, and parts and manufacture thereof which overcome or at least partly ameliorate at least some deficiencies as associated with the prior art.

SUMMARY OF THE INVENTION

In a first aspect, the present invention provides A valve block for a valve assembly of a wind musical instrument, said valve block comprising a monolithic structure having a plurality of parallel and linearly spaced apart valve bores extending at least partially therethrough and for receiving a corresponding plurality of valve pistons therein; an air ingress port extending through the valve block from external of the valve block and providing fluid communication between external of the valve block and a first valve bore; an air outlet port extending through the valve block from external of the valve block and providing fluid communication between external of the valve block and a further valve bore; transverse connecting passageways for providing fluid communication between adjacent valve bores; and a plurality of pairs of tuning section ports with each pair extending through the valve block from external of the valve block and providing fluid communication between external of the valve block and a valve bore.

The valve bores preferably extend fully through said valve block.

The valve block preferably includes three valve bores for receiving three corresponding valve pistons therein.

The air ingress port provides fluid communication between external of the valve block and the third valve bore, the air outlet port provides fluid communication between external of the valve block and the first valve bore.

The air ingress port is receiving a vibrating column of air from a lead pipe of a wind musical instrument, the air outlet port is for providing fluid communication with a bell pipe of a wind musical instrument, and the tuning section ports are for providing fluid communication and passage of air through corresponding tuning sections.

The monolithic structure of the valve block may be formed from a metal or a metal alloy. Preferably, the monolithic structure of the valve block is formed from aluminum or an aluminum alloy.

Alternatively, the valve block may be formed from a polymeric material.

The central axes of the air ingress port and the air outlet port may be coaxial and colinear.

The central axes of the air ingress port and air outlet port may be coaxial and colinear along the longitudinal midplane extending through central axes of said plurality of valve bores.

The valve block may further comprise an engagement surface for engagement with a manifold for providing fluid communication and passage of air from at least one of the pair of tuning section ports.

In a second aspect, the present invention provides a wind musical instrument, comprising a valve block according to the first aspect; a plurality of valve pistons, each of which is disposed with a valve bore of said valve block; a lead pipe in fluid communication with the air inlet port of said valve block; a bell pipe in fluid communication with the air outlet port; and a tuning section in fluid communication with each pair of tuning section ports.

The wind musical instrument may comprise a distal manifold disposed between the valve block and the lead pipe, and a proximal manifold disposed between the valve block.

The distal manifold may be further disposed between a third bore tuning section port and a corresponding tuning section, and the proximal manifold may be disposed between a first and a second bore tuning section port and the corresponding tuning sections.

BRIEF DESCRIPTION OF THE DRAWINGS

In order that a more precise understanding of the above-recited invention can be obtained, a more particular description of the invention briefly described above will be described by reference to specific embodiments thereof that are illustrated in the appended drawings. The drawings presented herein may not be drawn to scale and any reference to dimensions in the drawings or the following description is specific to the embodiments disclosed.

DETAILED DESCRIPTION OF THE DRAWINGS

Figure 1:
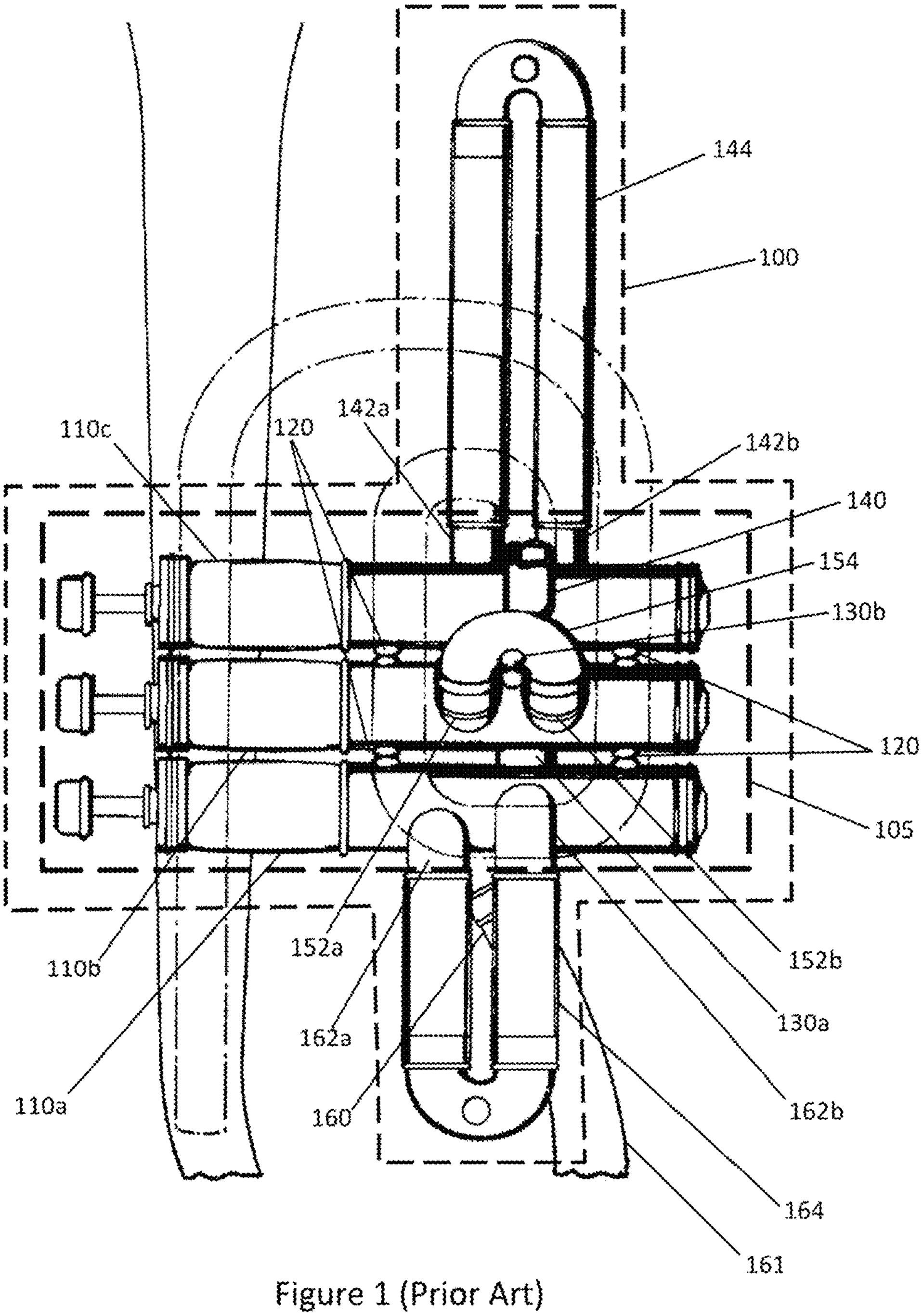
Figure 1 (Prior Art)
FIG. 1 depicts a schematic representation of a tuning assembly including valve assembly of a valve instrument of the Prior Art.

The present inventor has identified shortcomings of musical instruments, and parts and manufacture thereof and upon identification of the problems with the prior art, has provided a valved wind instrument, and parts and manufacture thereof which overcomes the problems of the prior art.

Explanation of Background of Invention

In typical linear three-valve piston brass instruments, an instrument comprises a tuning assembly 100 which includes a valve assembly 105 which is in communication with tuning sections 144, 154 and 164.

The valve assembly 105 which comprises three parallel cylindrical valve casings 110*a*, 110*b* and 110*c*, which are affixed relative to each other via spanner braces 120 or which may also be termed "stays" or "connectors", which are soldered or brazed in place. Typically, two spanner braces 120 are used to secure each valve casing 110*a*, 110*b*, 110*c* to an adjacent valve casing 110*a*, 110*b*, 110*c*.

The first valve casing 110*a* and the second valve casing 110*b* are in fluid communication with each other by way of a first connecting knuckle 130*a* which is a connecting tube which is soldered or brazed in knuckle holes or ports which extend through the walls of the valve casing 110*a*, 110*b*.

Similarly, the second valve casing 110*b* and the third valve casing 110*c* are in fluid communication with each other by second knuckle 130*b*, which is more readily viewable from the other side of the instrument as will be known by those skilled in the art, again which is soldered or brazed in knuckle holes or ports which extend through the walls of valve casing 110*b*, 110*c*.

The third valve casing 110*c* has an air inlet knuckle 140 for receiving the lead pipe of the instrument, which is not shown in this representation, and two 3rd valve tuning section knuckles 142*a*. 142*b* for receiving the third valve tuning section 144.

The second valve casing 110*b* has two tuning section knuckles 152*a*, 152*b* for receiving the second valve tuning section 154.

The first valve casing 110*a* has an air inlet knuckle 160 for receiving the bell pipe, and two first valve tuning section knuckles 162*a*, 162*b* for receiving the first valve tuning section.

Within each valve casing, there is a linear operable valve piston of a piston valve, which valve piston is biased upwards. When the valve pistons are at the upper position, the valves occlude airflow through their respective tuning sections, and there is a fluid passageway from the lead pipe knuckle to the bell pipe knuckle through passages provided by the valve pistons and through the connecting knuckles.

When a valve is pressed and moved to a lower position, the fluid passageway also passes through the length of the respective tuning section.

As such and as described above, the use of such valves alters the overall length of the tube of the instrument and as such, can provide seven combinations or more of tube lengths, and this coupled in conjunction with the harmonics of each length of the tube of the instrument, allows the player to provide a chromatic scale within the key or pitch that the instrument is designed, over several octaves.

In some valve type musical instruments, a further valve is provided which puts an additional overall length of tube in the instrument to change the key of the instrument. As will be noted, while although the above has been described in reference to linear piston valves in a valve casing, rotary piston valves in a valve casing operate in the same manner, and such casings have the same features as those in relation to a linear piston type valve and as such, the above description is equally as applicable to a rotary valve system such as is utilized in a French horn or a rotary valve trumpet, for example.

The present inventor has identified the problems of valve systems for brass instruments of the prior art, including from repair, maintenance and manufacturing standpoints.

Manufacturing Problems of Prior Art as Identified by Present Inventor

The assembly process of the valve assembly of a brass instrument, as well as the rest of the instrument client, requires high precision, as well as skilled labor, in order to ensure that the various components which form a brass instrument, and those which formed the tuning section which includes the valve section of the musical instrument, is correctly and sturdily assembled.

When assembling the valve section, all three valve casings need to be accurately aligned with each other, and then affixed relative to each other by way of spanner braces, such as is discussed above.

Further, it is necessary to provide accurately formed connecting knuckles and connecting tubes which interconnect between adjacent valve casings.

The valve casings are required to be placed in correct order for assembly and appropriately aligned and rotated, with the connecting knuckles placed in knuckle holes or ports which extends through the walls of the valve casings.

Then, the spanner braces and connecting knuckles must be soldered or brazed in place, with all valve casings correctly aligned in parallel, and as well as spaced apart, such that the connecting knuckles provide the correct airflow passage length between adjacent valve casings.

The connecting tubes, or knuckles, on the valve casings, and the spanner brace are then hard soldered or brazed in place, and it is important to make sure that each is properly soldered.

During the brazing process, that is the application of hard solder to the connecting knuckles, the valve casing may be heated to around 1100 degrees. When cooled, the valve casings may maintain some of the tension caused due to the extreme heat.

Some instrument manufacturers remove a small amount of material around the edge of the tubing inside the casing before fitting the valve, which helps to reduce the likelihood of the valve piston sticking.

However, many instruments have problems with sticking valves due to a lack of clearance between the edge of the valve liner hole and the valve casing knuckle ports, which may be subsequently mitigated by scraping the valve casing ports with a radius scraper and then lapping the valves with a fine lapping compound.

As will be understood, the manufacturing of the valve assembly of a musical instrument requires high precision, as well as manufacturing techniques which, in some cases, may result in distortion or impediment of free motion of valve pistons within valve casings to the extent which is required in a brass instrument, and requires correct accuracy of spacing such that the airflow length is correct in order to have a well-tuned and accurate instrument.

Impact and Damage Problems of Prior Art as Identified by Present Inventor

As will be noted, brass instruments may suffer damage from impact with other instruments or objects, from falling from a stand or a chair, toppling over onto a hard surface, from being dropped, from being laid upon or sat upon, during cleaning and disassembly and reassembly, as well as a myriad of other physical impacts which may cause damage to an instrument.

Furthermore, normal wear and tear when handling a brass instrument, has also been found to provide damage and fatigue to the valve section of a brass instrument.

As has been noted by the present inventor, the spanner braces between valve casings may, from wear and tear, as well as from impact, become loose and not rigidly affixed the valve casings relative to each other. Small amount of motion of one valve casing relative to the other valve casing can further exacerbate this problem, and in some cases can cause resonance and oscillation between the spanner braces and the valve casing, which can be perturbing for a player. Furthermore, such increased stress may put greater stresses on other spanner braces, causing further failure, and damage to the instrument.

As such, in such cases, it is necessary for a musical instrument to be sent to a repair shop or the manufacturer for repair, and resoldering of the spanner braces back in place, as well as removal of dents. Such resoldering and heating can cause damage to the lacquer coating or silver coating on a brass instrument, and result in an unsightly repair, as well as in the removal of lacquer which protects the brass instrument from oxidation, and thus provide the opportunity for oxidation type damage at the spanner brace and valve casing interface, thus causing further damage.

Furthermore, when a valve casing may move relative to another valve casing, this also places stresses on the joints of the connecting knuckles, which can cause further damage to the musical instrument.

Another common problem, in particular for trumpets and comets, is for the second valve slide or tuning section on trumpets and comets to push into the valve casing at the knuckle position, which causes seizing the piston or jamming it during movement.

There are several ways to fix this problem, one being to grab the 2nd slide, flexing it outward to alleviate the stress at the casing. Some repairers may use the first valve slide to gain leverage for the procedure although this increases the chances for breaking the outer valve slide tube solder joints, which can result in more time consuming and costly repair.

Also, the pressure exerted by a bent bell pipe on a first valve casing knuckle can be enough to seize the piston, or cause difficultly in movement of the valve piston.

Another manner in which a valve casing may be damaged, is at the threads at the lower end of the valve casing, which causes a valve piston to jam at the bottom of its stroke. This can often occur when lower valve casing endcaps are removed and during cleaning, and also cause damage to the thread.

Damage to a valve piston and valve casing, causing movement of valve pistons to be impeded, includes knuckle damage and spanner brace damage, whereby stresses on the instrument body can force the knuckles or spanner braces to protrude into the casing wall, which can result in costly and time-consuming repair to the instrument. Such damage, as well as causing damage to the valve casing which needs to be straightened appropriately, and which can also cause damage to the valve piston, which also may result in further repair work and straightening, and dent removal being required to be performed on the valve piston also.

As will be understood, damage to a brass musical instrument, can result in expensive repairs being required, as well as an instrument, in some cases, not being able to be restored back to its original state.

Such damage to the valve section of a musical instrument can result in sluggish or sticky valves, incomplete air sealing and loss of air through gaps, which compromises the integrity of the instrument and its performance when being played. In some cases, it is very difficult and costly for a technician or a repairer to restore the instrument back to its original condition.

Further, a very commonly reported frustration by musical instrument players of brass valve instruments, particularly for student level and entry level instruments, is sluggishness of valves, and sticking of valves during playing of the instrument. This can be extremely frustrating for players, in particular younger players when physical performance of the instrument hinders their advancement and interest in continuing to learn and play and can be discouraging.

Still further, the cost of repair to a musical instrument can be quite high, when damage has been made to the valve section of the instrument in particular, requiring specialist technical repair by person skilled in brass instrument repair and reconstruction. In the case of entry level and intermediate level instruments, such repairs can be quite high in cost. In some cases, repair costs can exceed the actual cost of the initial purchase outlay of the instrument, which can be frustrating and troublesome, in particular to parents of younger or more junior players, when it is necessary to pay for repair, as well as delay in the student being able to use an instrument whilst it is at the repair workshop.

Present Invention

The present inventor, in view of the foregoing problems identified in at least the manufacturing, maintenance and repair of brass wind valved instruments, has provided a solution to the identified problems, and has provided a valve assembly for a wind brass instrument, and a wind brass instrument, which overcomes such problems and deficiencies of the prior art from manufacturing maintenance and repair standpoints.

It must be noted and understood that the term "brass instrument" or "brass musical instrument" as used herein, is used in its conventional meaning within the art, which is to denote a wind musical instrument having a length of tubing, which at one end receives a cup mouthpiece for a player's lips, and at the other end has a bell from which the sound is emitted from the instrument.

Whilst the term brass is used, as is known and will be understood by those skilled in the art, this term is used from a traditional standpoint, whereby such musical instruments were typically made from a brass, an alloy of copper and zinc and as such, such instruments are known as brass instruments, and sections of an orchestra or band in which such instruments played are often called a "brass section".

However, as is known, such so-called "brass instruments" or "brass musical instruments", while often being formed from brass, may also be made from other metals and metal alloys.

Furthermore, such instruments may be also formed from other materials, including polymeric materials, composite materials, mixed polymer blends, fiber reinforced polymers and the like.

Accordingly, within the present invention, the present invention is directed towards such brass instruments, and this term includes instruments and portions thereof as formed from other metal or metal alloys, such as aluminum or aluminum alloys, as well as polymeric materials and composite materials, including fiber reinforced polymeric materials, as well as instruments which may not include any brass components or other metal components.

Accordingly, the term "wind musical instrument" as used in the present invention, defines an instrument traditionally known as a "brass instrument" or "brass musical instrument", which may be formed from any metal, or non-metal material, as well as combinations thereof, and which includes a valve assembly for altering the length of the instrument by way of movable valve pistons, which allows the length of the instrument to be increased by way of corresponding tuning sections.

As such, a "wind musical instrument" with the present invention is the type of instrument is often termed "brass instrument" or "brass musical instrument", having a tuning assembly comprised of a valve section and tuning sections.

The valve section allows for user operable and moveable pistons which, when moved, increase the length of the tube by the length of the tuning section engaged by the relevant valve piston.

Accordingly, the "wind musical instrument" and valve assembly of the present invention, are in respect of valved brass instruments, however, as will be understood without limitation to the instrument being necessarily formed from a brass material, or any particular material to that end.

Within the present invention and specification, the term "tuning assembly" is understood to mean a "valve assembly" of a wind valved instrument in combination with a plurality of "tuning sections" for increasing the overall length of the tube of the instrument.

Further, within the present invention, the term "valve assembly" is understood to mean a combination of valve piston housings such as valve casings or housings, and "valve pistons" disposes within the valve piston housings.

Further, the term "valve piston" is understood to include the valve body of both linear operable valves such as are typically implemented in instrument such as trumpets, and to also include rotary operable valves such as typically implemented in instruments such as a French horn.

So as to overcome such deficiencies and shortcomings as identified, and referring to FIGS. 2A-2G, an exemplary embodiment of the present invention is shown, in which there is provided a valve block 200 for a valve assembly of a wind musical instrument.

The valve block 200 houses user operable valve pistons, which are not shown in the drawings, and is engageable with tuning sections to form a valve assembly, The valve block is further engageable with a lead pipe and bell pipe so as to form a wind musical instrument.

The valve block 200 includes 3 valve bores 210*a*, 210*b*, 210*c* extending therethrough, for receiving a piston valve in each valve bore respectively. In the present embodiment, the valve bores 210*a*, 210*b*, 210*c* extend fully through the valve block 200. However, in alternate embodiments, the valve bores may extend only partially through the valve block from the top towards the bottom, with the bottom portion of the valve bores being occluded, and such an embodiment is understood to also fall within the scope of the present invention, as in some embodiments the bores need not necessarily extend all the way through the valve block.

The valve block 200 is preferably formed from a metal or a metal alloy material, such as aluminum or an aluminum alloy.

In embodiments of the invention, the valve block may be formed by way of an extruded section, with the outer surface having a requisite predetermined geometry, and having a plurality of passages extending therethrough each for receiving valve pistons.

The outer surface of the valve block 200, as shown in the present embodiment, which is for utilization in a trumpet or cornet type musical instrument although as will be understood may be used in other wind valve instruments, has a suitable contour for ease of holding as is typical for such instruments.

In other or alternate embodiments, the outer surface requisite predetermined geometry of the valve block may differ, depending upon requirements.

Further, as with the present embodiment of the valve block 200, the wave-like cross sectional shape for the valve block 200, allows for both reduction in material whilst still providing sufficient and adequate strength between the valve bores and at the ends, so as to achieve the objectives of the invention and advantages thereof, which are discussed in further detail below, including preventing damage to the valve bores from impact of spanner braces and knuckles, and damage to the ends of the valve bores and casings from impact.

The advantages of the reduction in material usage in such an extrusion process, further includes the advantage of weight reduction of the valve block 200, thus providing for a musical instrument having a sufficiently low weight for ease of handling and in use. This assists in preventing or reducing fatigue by a player, in particular junior players who, as will be known, can suffer from fatigue and tiredness from holding such instruments for extended periods of time, such as during practice and performance.

Furthermore, the outer surface of the valve block, when the valve block is extruded from aluminum or an aluminum alloy, may be in a finished state, and not require further surface finishing, which provides further economic and manufacturing advantages.

In such an embodiment whereby the valve block 200 is formed by way of an extrusion process, the passages may require some further processing before receiving the valve pistons therein, such as a boring process followed by honing, so as to provide a suitably sized and finished valve bore for subsequently receiving the valve pistons.

Further, by including such passages, for subsequent finishing as valve bores, in the extrusion process, provides the manufacturing and cost advantages of reduction of material utilized, as well as the manufacturing and cost advantages of only boring and honing of the passages to form the requisite valve bores for receiving the valve pistons, rather than forming a valve bore in solid billet material by way of machining processes.

Further, the valve block 200, is preferably formed as a unitary structure, and in the case of being formed from a metal or metal alloy such as aluminum, the various aspects of the valve block 200 are discussed further below, which can be formed by way of extrusion as discussed above, following a machining process, such as CNC (computer numeric controlled) machining or milling by way of a 3 axis CNC milling machine, for forming the valve bore, ports, connecting passageways, apertures, engagement surfaces and threaded holes, whereby these features which are discussed.

As will be understood, the valve block 200 need not necessarily be formed from an extrusion process, and in fact may be formed from a solid billet material by way of machining, in other or alternative embodiments, or formed from a polymeric material by way of a molding process for example.

The first valve bore 210*a*, for receiving a first piston valve, includes tuning ports 211*a* and 211*b* in fluid communication with the first valve bore 210*a*, for connection with a first valve tuning section, the details of which, in a preferred embodiment, as described below in reference to subsequent drawings.

The second valve bore 210*b*, for receiving a second piston valve, includes tuning ports 212*a* and 212*b* in fluid communication with the second valve bore 210*b*, for connection with a second valve tuning section, the details of which, in a preferred embodiment, also as described below in reference to subsequent drawings.

The third valve bore 210*c*, for receiving a third piston valve, includes tuning ports 0213*a* and 211*b* in fluid communication with the third valve bore 210*c*, for connection with a third valve tuning section, the details of which, in a preferred embodiment, and described below in reference to subsequent drawings.

Further, in reference to the third valve bore 210*c*, there also is provided an air ingress port 220 which is in fluid communication with third valve bore 210*c*. Air ingress port 220 is for fluid communication with a lead pipe when the valve block 200 is implemented in a musical instrument.

Referring again to the first valve bore 210*a*, there is an air outlet port 230 in fluid communication with first valve bore 210*a*, for providing an outlet path and fluid communication with a bell pipe of a musical instrument when the valve block 200 is implemented in a musical instrument.

As will be noted, in the present embodiment, the air ingress port 220 is coaxial and colinear and aligned with air outlet port 230, and both ports are midway along the width of the valve block 200.

Furthermore, in the present embodiment, there are transverse connecting passageways for providing fluid communication between adjacent valve bores.

This is in contrast to air ingress ports and air outlet ports of the prior art, which are offset from the longitudinal midplane of the valve assembly, and the present invention, by virtue of having the air ingress port 220 and the air outlet port 230 coaxial and co-linear on the midplane of the valve block 200, provides for further ease of machining and manufacture and advantages therewith.

As will be understood and appreciated, transverse connecting passageways for providing fluid communication between adjacent valve bores are provided, such that a first connecting passageway extends and provides fluid communication between the first valve bore and the second valve bore, and a second connecting passageway extends and provides fluid communication between the second valve bore and the third valve bore.

Also, as should be noted and understood, the first transverse connecting passage for providing fluid communication between the first valve bore 210*a* and the second valve bore 210*b*, and the second transverse connecting passage for providing fluid between the second valve 210*b* and the third valve 210*c* are also collinear and coaxial with the air ingress port 220 and the air outlet port 230, and in the present embodiment all have the same diameter.

Figure 2A:
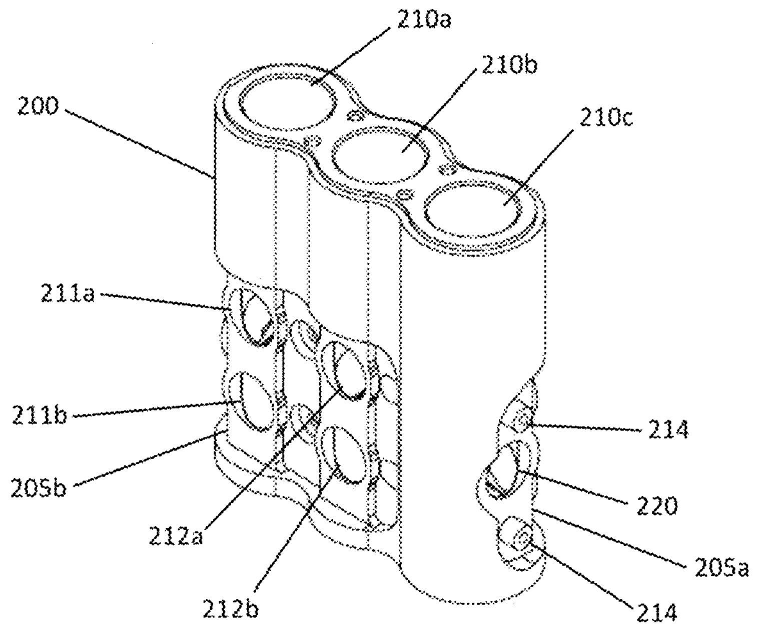
FIG. 2A shows a first perspective view of a valve block according to the present invention.
Figure 2B:
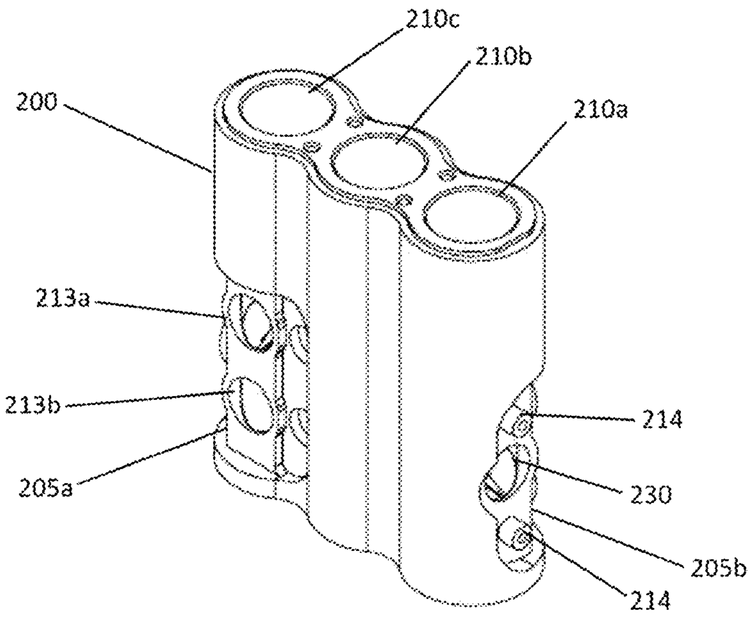
FIG. 2B shows a second perspective view of the valve block of FIG. 2A.
Figure 2C:
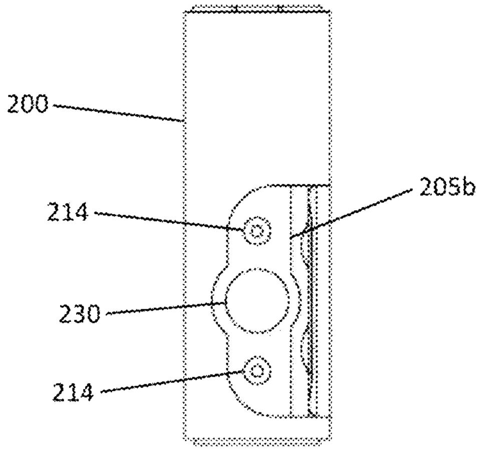
FIG. 2C shows an end view of the valve block of FIGS. 2A and 2B.
Figure 2D:
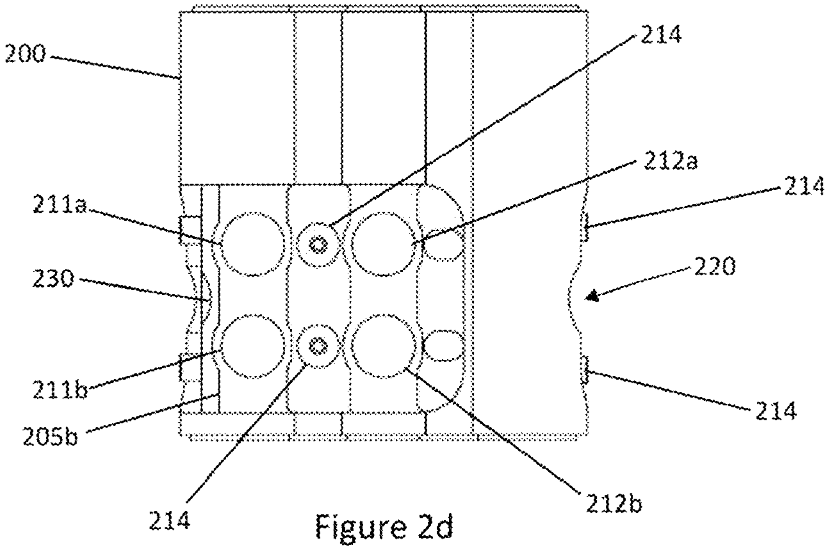
FIG. 2D shows a first side view of the valve block of FIGS. 2A-2C.
Figure 2E:
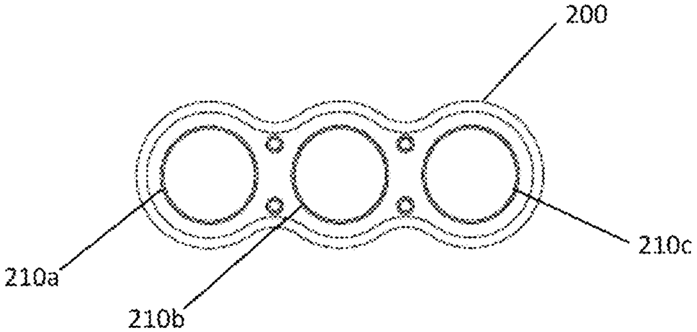
FIG. 2E the shows a top view of the valve block of FIGS. 2A-2D.
Figure 2F:
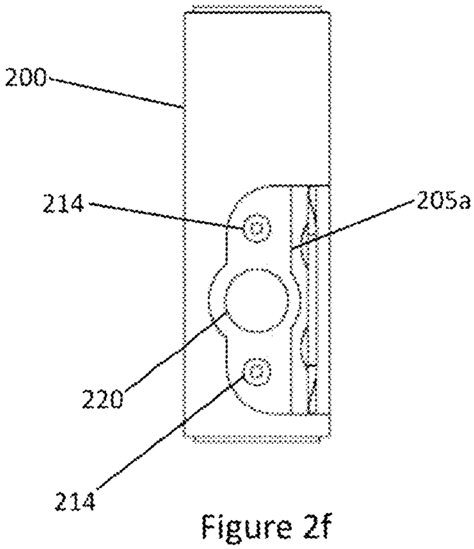
FIG. 2F shows an end view of the valve block of FIGS. 2A-2E.
Figure 2G:
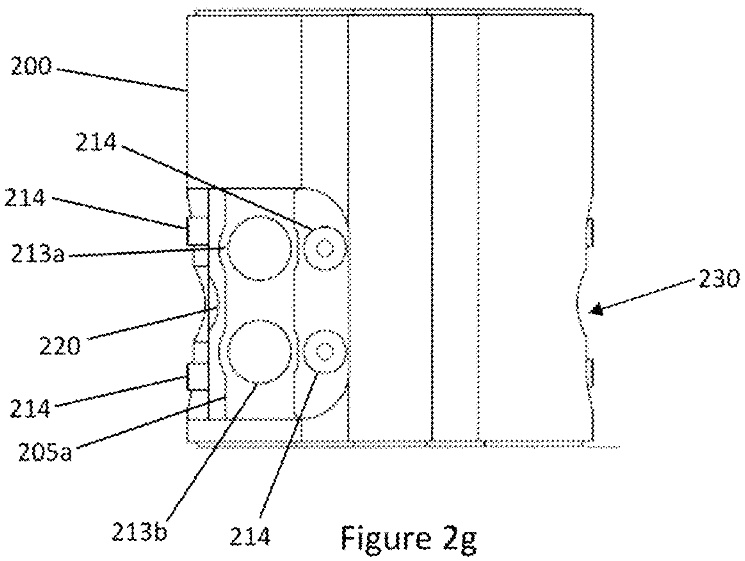
FIG. 2G shows a second side view of the valve block of FIGS. 2A-2F.
Figure 3A:
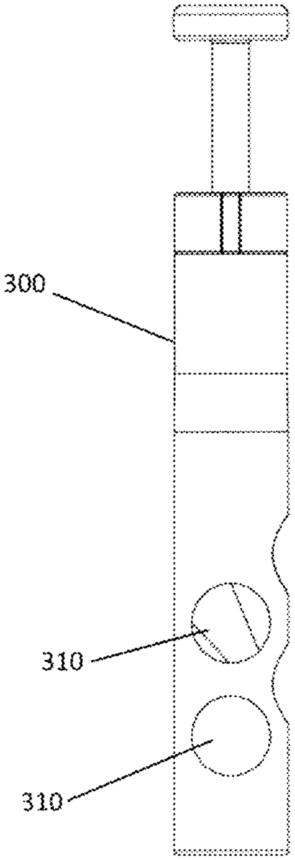
FIG. 3A shows a front view of a first embodiment of a piston valve for use in conjunction with a valve block according to the present invention.
Figure 3B:
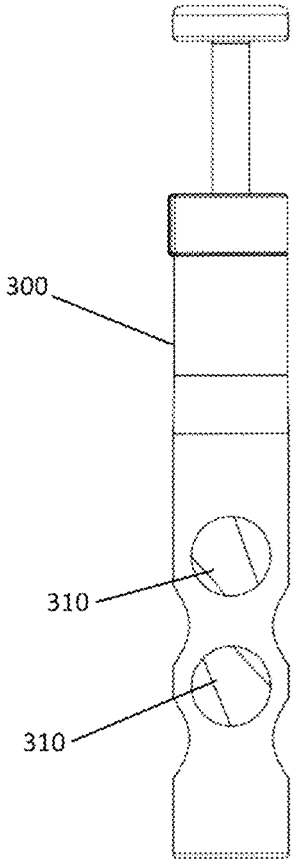
FIG. 3B shows a side view of the piston valve of FIG. 3A.
Figure 3C:
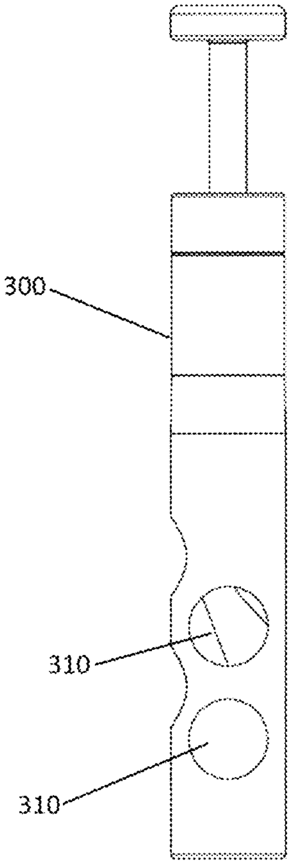
FIG. 3C shows a rear view of the piston valve of FIGS. 3A-3B.
Figure 3D:
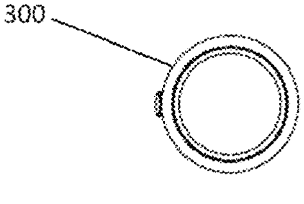
FIG. 3D shows a top view of the piston valve of FIGS. 3A-3C.
Figure 3E:
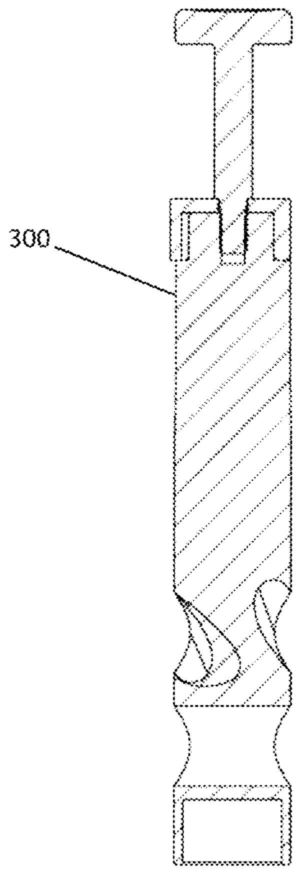
FIG. 3E shows a sectional view of the piston valve of FIGS. 3A-3D.
Figure 4A:
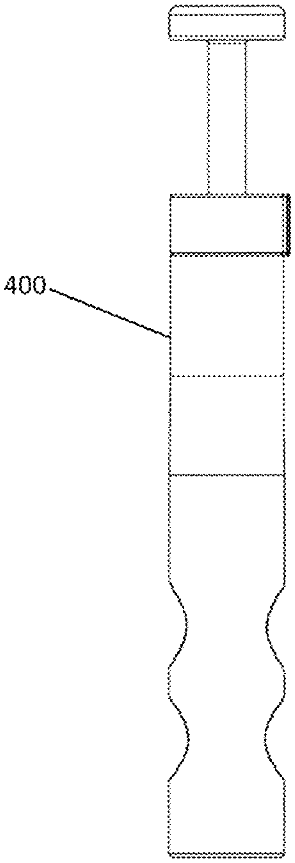
FIG. 4A shows a front view of a second embodiment of a piston valve for use in conjunction with a valve block according to the present invention.
Figure 4B:
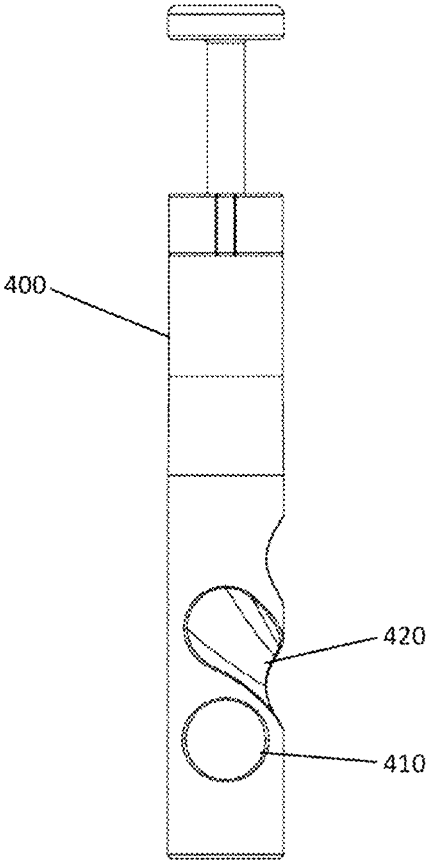
FIG. 4B shows a left side view of the piston valve of FIG. 4A.
Figure 4C:
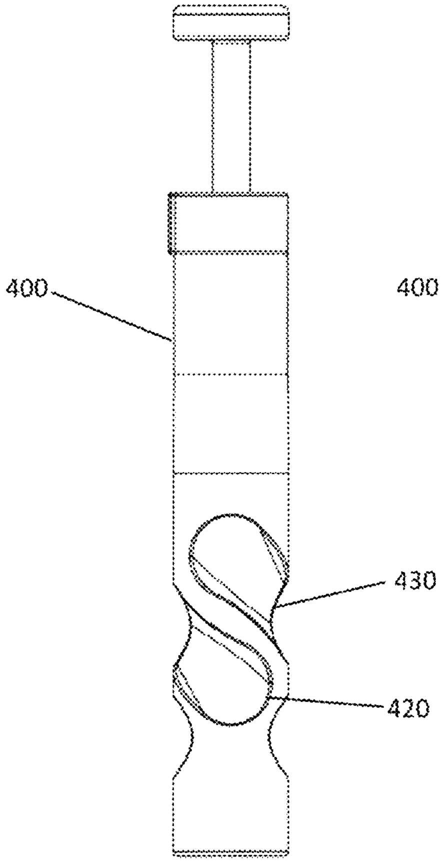
FIG. 4C shows a rear view of the piston valve all FIGS. 4A and 4B.
Figure 4D:
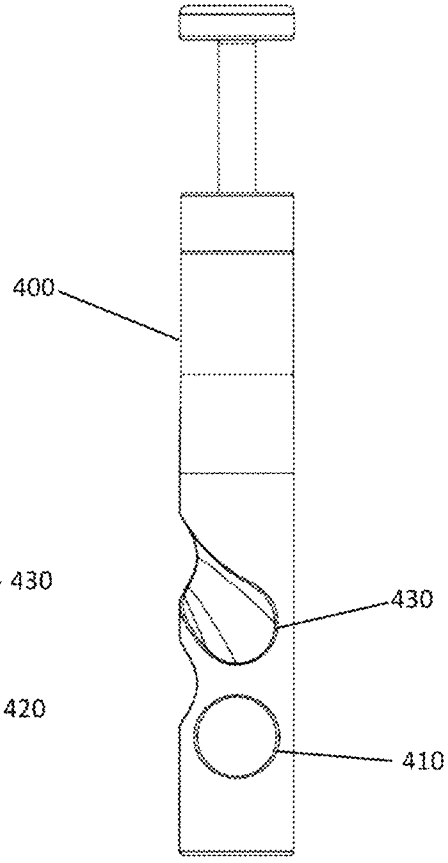
FIG. 4D shows a right side view of the piston valve of FIGS. 4A-4C.
Figure 4E:
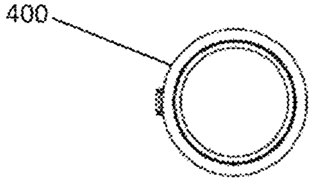
FIG. 4E shows a top view of the piston valve of FIGS. 4A-4D.
Figure 4F:
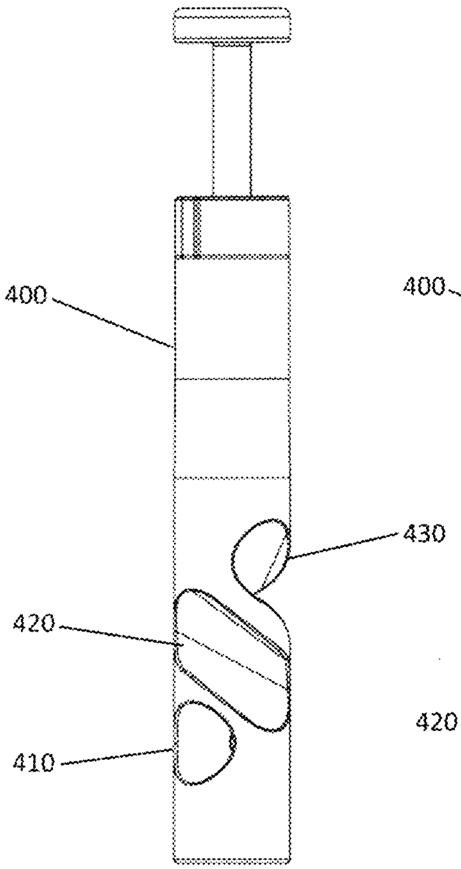
FIG. 4F shows a view of the piston valve of FIGS. 4A-4E in the orientation as rotated with respect to FIG. 4H.
Figure 4G:
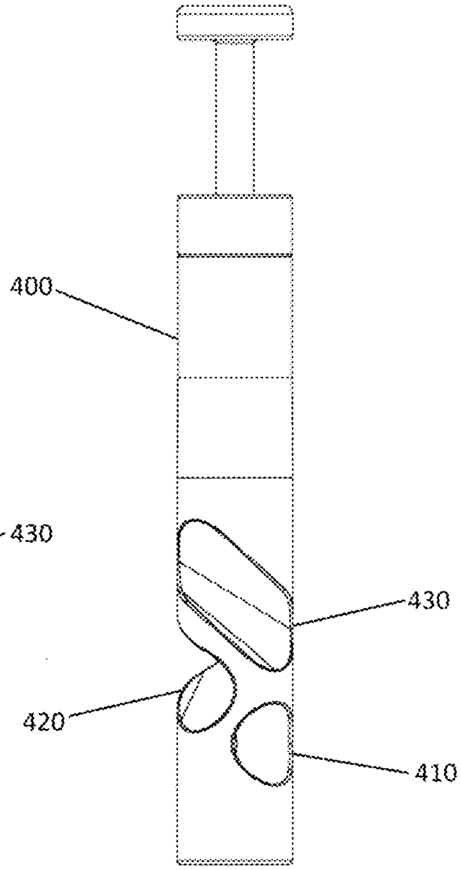
FIG. 4G shows a view of the piston valve of FIGS. 4A-4F for the in the orientation as rotated with respect to FIG. 4I.
Figure 4H:
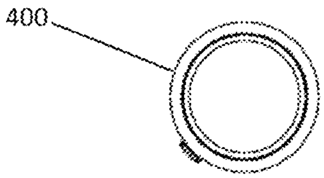
FIG. 4H shows a top view of the piston valve according to FIGS. 4A-4G at a first angle of rotation.
Figure 4I:
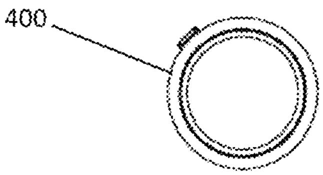
FIG. 4I shows a top view of the piston valve according to FIGS. 4A-4G at a second angle of rotation.
Figure 4J:
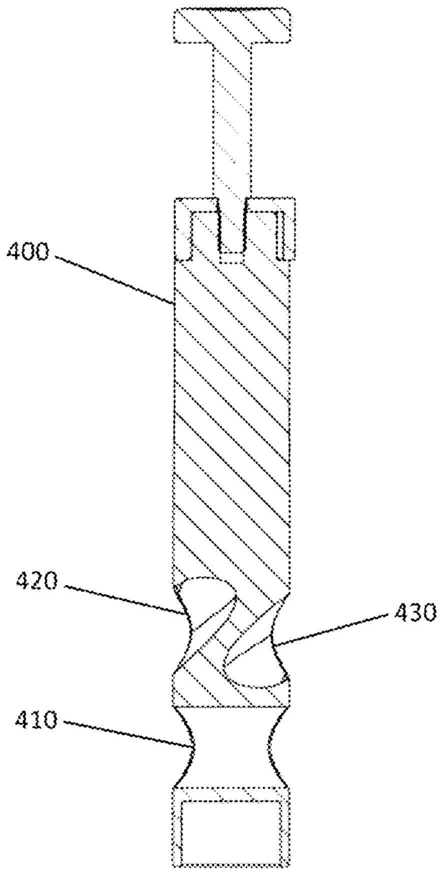
FIG. 4J shows a sectional view of the piston valve according to FIGS. 4A-4I.

As such, as can be seen in FIGS. 2C and 2F, a linear passageway extends from external of the valve block 200, through the entire of valve block 200, formed by the air inlet port 220 extending into the third valve bore 210*c*, through the body of the valve block 200, by way of the second transverse connecting passageway, which forms a passageway and fluid communication between the third valve bore 210*c* and the second valve bore 210*b*, and by way of the first transverse connecting passageway extends through the body of the valve block 200 from the second valve bore 210*b* to provide further fluid communication with the first valve bore 210*a*, and the linear passageway then which extends through the outer body of the valve block 200 through outlet port 230.

Accordingly, the air ingress port 220, the first connecting passage, the second connecting passage and the air outlet port 230 are coaxial and collinear, and may have the same diameter in embodiments of the invention.

As will be understood and appreciated, the air inlet port 220 and the air outlet port 230, need not necessarily be colinear and coaxial, and may be offset from each other in a direction the longitudinal axes of the valve bores, in alternate embodiments. However, as is discussed below, the present embodiment, with the air inlet port and the air outlet port and the transverse connecting passageways allows for three same valve pistons to be used, as well as ease of manufacture.

As will also be understood, the transverse connecting passageways need not necessarily be colinear and coaxial. For example, in the event that the air inlet port and the air outlet port are offset vertically, the transverse connecting passageways may also be offset such that the first transverse connecting passageway is coaxial and colinear with the air outlet port, and the second transverse connecting passageway is coaxial and colinear with the air inlet port.

Also, as will be understood, in other embodiments whereby the air inlet port and the air outlet port are offset, the air inlet port and the first and second transverse connecting passageway may coaxial and colinear, or alternatively the air outlet port and the first and second transverse connecting passageway may coaxial and colinear in other embodiments.

Further, as will also be understood, in other or alternate embodiments, the air inlet port and the air outlet port need not necessarily be aligned along the midplane of the valve block, and may be disposed towards a side of the valve block, similarly as with a conventional trumpet.

It must be appreciated, that although the valve block of the present invention is described for use with a metal/polymer composite material, the valve block of the present invention may also be utilized with conventional brass instruments, in other embodiments.

The present invention, in the present embodiment, further includes a plurality of threaded holes 214 for affixing a manifold to the valve block 200, as is described further below, whereby a distal manifold is affixed to the valve block 200 at distal engagement surface 205*a* which provides fluid communication (i) between the lead pipe and the third valve bore 210*c* and (ii) between the third valve tuning section and the third valve bore 201*c* of the valve block 200.

A proximal manifold provides fluid communication (i) between the bell pipe and the first valve bore 210*a*, (ii) between the first valve tuning section and the first valve bore 210*a*, and (iii) between the second valve tuning section and second valve bore 210*b*, embodiments of which and described and discussed in subsequent drawings.

As is shown, distal engagement surface 205*a* is provided for engagement with a distal manifold, and proximal engagement surface 205*b* is provided for engagement with a proximal manifold, as is shown in later embodiments below.

The distal engagement surface 205*a* and proximal engagement surface 205*b* may be formed by way of CNC machining.

Referring to FIGS. 3A-3E, there is shown an example of a valve piston 300 which may be utilized in a conjunction with the valve block 200 of FIG. 2A-2G. Such a valve includes apertures 310 extending therethrough, so as to provide passage of air between the valve bores, as well as passage of air to tuning sections associated with the first, second and third valves.

By utilizing the valve block 200 of FIG. 2A-2G, the present inventor has found that the same valve may be utilized for each of the valve bores and as such, there is no particular or specific valve piston for a specific valve bore of a valve block 200.

Accordingly, and advantageously, such a valve arrangement offers convenience, particularly for younger players, and mitigates the likelihood of valves being put in the incorrect valve bores and damage being inflicted to the musical instrument in which they reside.

Such a valve 300, may be sprung either by an internal spring, similarly as with many valve type musical instruments, by an external spring below the piston, or alternatively, an external spring above the piston. As such, any arrangement is applicable to the present invention, provided that suitable restoration force is provided to return the spring to the normal rest position, otherwise known as the open position, and that the force in order to overcome the valve spring and move the valve to the closed position is not restrictive and allows for ease of playing of the musical instrument.

Referring now to FIGS. 4A-4J, there is shown an alternative embodiment of a valve piston 400 which may be utilized in accordance with the valve block 200 of FIGS. 2A-2G.

The valve piston 400 includes aperture 410 which extends through the body of the piston valve 400, and passages 420 and 430, which are open type passages, and extend partially through the body of the valve piston 400, and are open at the side of the valve piston.

Again, by utilizing the valve block 200 of FIGS. 2A-2G, the present inventor has found that the same valve may be utilized for each of the valve bores and as such, there is no particular or specific valve piston for a specific valve bore of the valve block 200.

Again, such a valve arrangement offers convenience, particularly for younger players, and mitigates the likelihood of valves being put in the incorrect valve bores and damage being inflicted to the musical instrument in which they reside.

Such a valve 300, may be sprung either by an internal spring, similarly as with many valve type musical instruments, by an external spring below the piston, or alternatively, an external spring above the piston. As such, any arrangement is applicable to the present invention, provided that suitable restoration force is provided to return the spring to the normal wrist position, otherwise known as the open position, and that the force in order to overcome the valve spring and move the valve to the closed position is not restrictive and allows for ease of playing of the musical instrument.

Figure 5A:
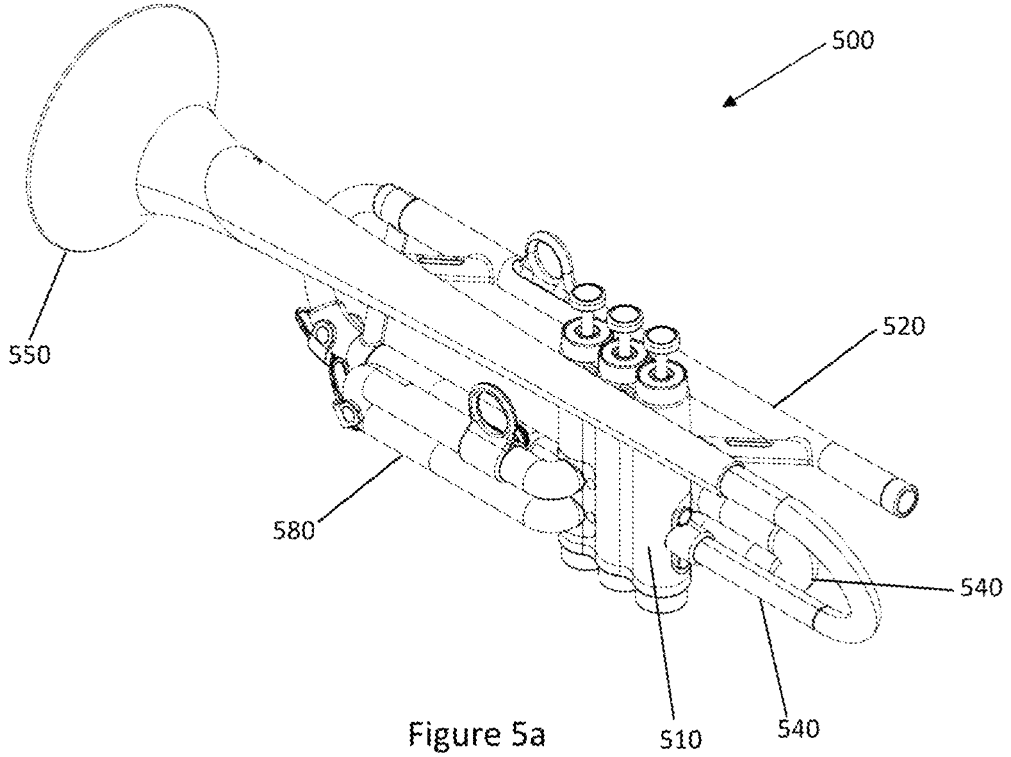
FIG. 5A shows a first perspective view of a first embodiment of a musical instrument incorporating the valve block according to the present invention.
Figure 5B:
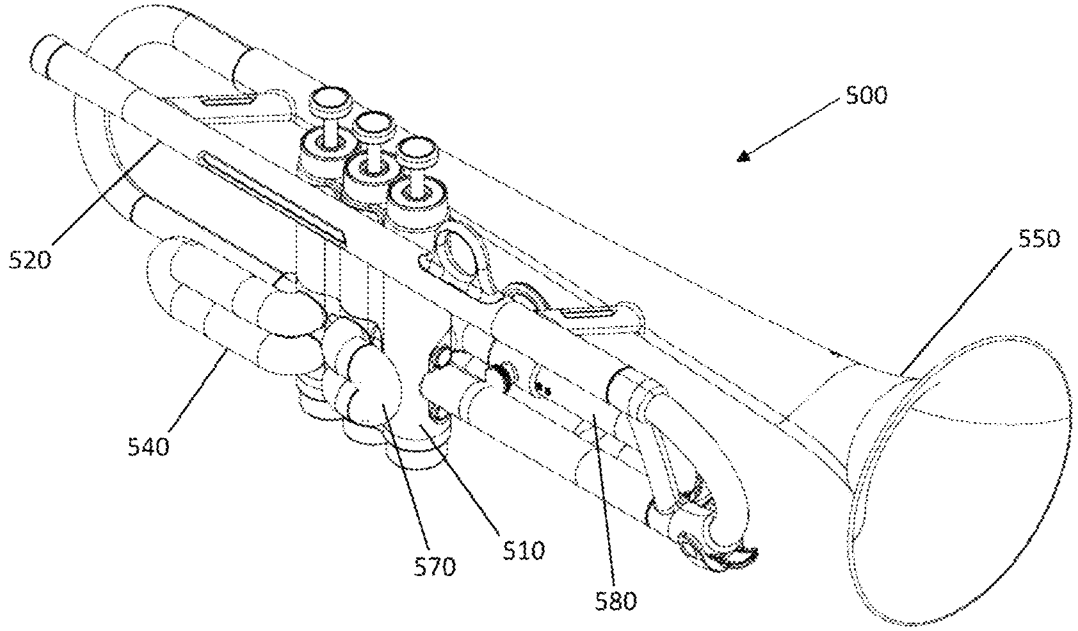
FIG. 5B shows a second perspective view of the embodiment of FIG. 5A.

Referring now to FIGS. 5A and 5B, there is shown a first embodiment of a musical instrument 500 incorporating the valve block 510 according to the present invention.

In the present embodiment, the musical instrument is a trumpet 500, which includes the valve block assembly 510 of the present invention. The musical instrument further includes a lead pipe 520, a first valve tuning section 540, a bell 550, a second valve tuning section 570, and a third valve tuning section 580.

Referring to FIGS. 6A-6D, there is shown an embodiment of a musical instrument according to the present invention, which incorporates the valve block as described above in accordance with the present invention.

In the present embodiment, the instrument is depicted as a trumpet, and it is provided as a multi-material construct, whereby the instrument is a combination of a polymeric material and metal materials.

The valve block 610, is provided as a metal alloy material which may be an aluminum or aluminum alloy, and is a valve block in accordance with the present invention and as described above in accordance with previous embodiments.

The instrument 600, includes a lead pipe 613, for introduction of air into the valve block 610, from mouthpiece 612. The lead pipe 613 further includes a tuning section 614 for the tuning of the instrument, as is typical for trumpets in accordance with the art. Lead pipe 613 is formed from any appropriate metal or metal alloy material, in the present embodiment stainless steel, and extends partially towards the valve block, and is received within a receiving port which is discussed in further detail in following drawings. As will be noted, the lead pipe 613 is partially encapsulated within a polymeric material by lead pipe portion 613*a*, and the stainless steel lead pipe can be viewed via slot 615 as shown.

A bell pipe 620 is provided, which is in communication with the valve block 610, and again which is received in a polymeric port which is discussed in further detail as follows. The bell pipe 620 has an upper bell pipe portion 621 engaged with the bell 622 of the trumpet 600, whereby the upper bell pipe portion 621 and the bell 622 are formed from a polymeric material.

The lead pipe 613 and the upper bell pipe portion 621 are affixed relative to each other via proximal lead pipe-bell pipe brace 615*a* and distal lead pipe-bell pipe brace 615*b*, similar disposed as in a conventional trumpet As will be appreciated, various polymeric materials or composite materials, mixed polymer blends or the like may be utilized in accordance with the present invention, for example, in the present involvement, a blend of ABS and polycarbonate may be utilized in order to provide the instrument more strength and resonance.

The instrument 600 further includes a first valve tuning section 630, a second valve tuning section 640 and a third valve tuning section 650 which includes a player-operable tuning slide assembly 652.

Piston valves, for example those as shown and described with reference to FIGS. 4A-4J or FIGS. 3A-3E may be utilized, and such piston valves 660 include finger buttons 662 for pressing the valves by the player of user, the valve body 664, lower end caps 668 which are engaged with the lower portion of the valve block 610, and include return springs 669 to urge the pistons 664 in an upwards direction.

Figure 6A:
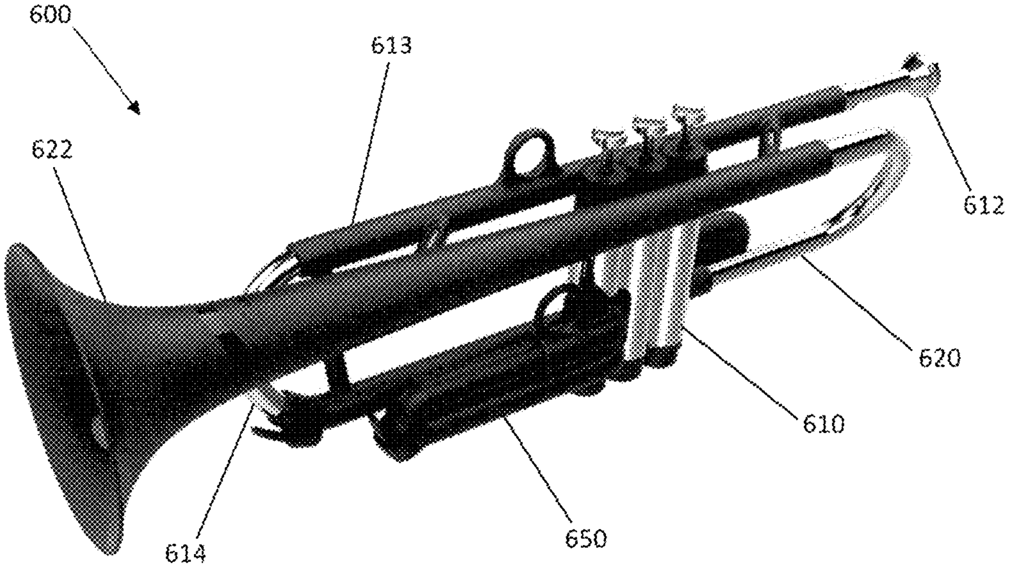
FIG. 6A shows a first perspective view of the embodiment of the musical instrument of FIGS. 5A and 5B.
Figure 6B:
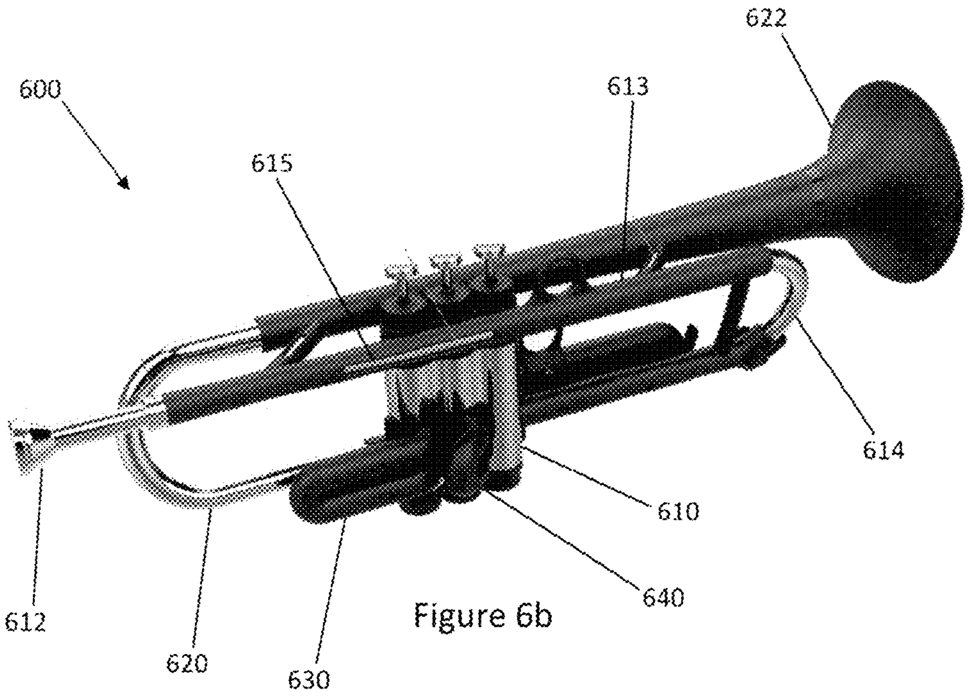
FIG. 6B shows a second perspective view of the embodiment of the musical instrument of FIG. 6A.
Figure 6C:
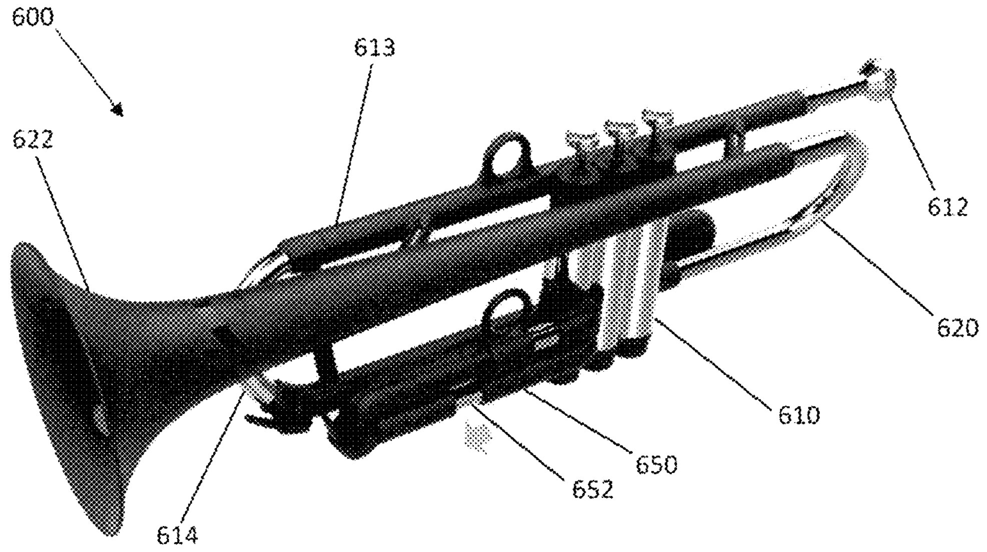
FIG. 6C shows a perspective view of the embodiment of FIGS. 6A and 6B with the third tuning slide extended.
Figure 6D:
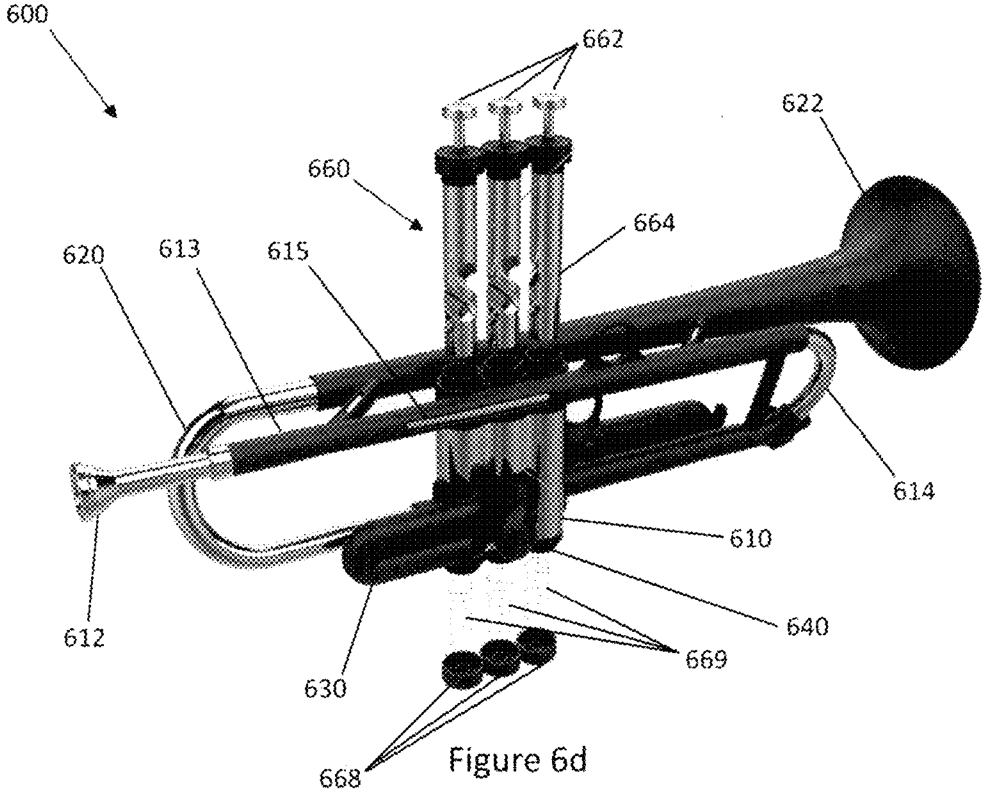
FIG. 6D shows a perspective view of the musical instrument of FIGS. 6A-6C with the valve assembly in an exploded arrangement.
Figure 6E:
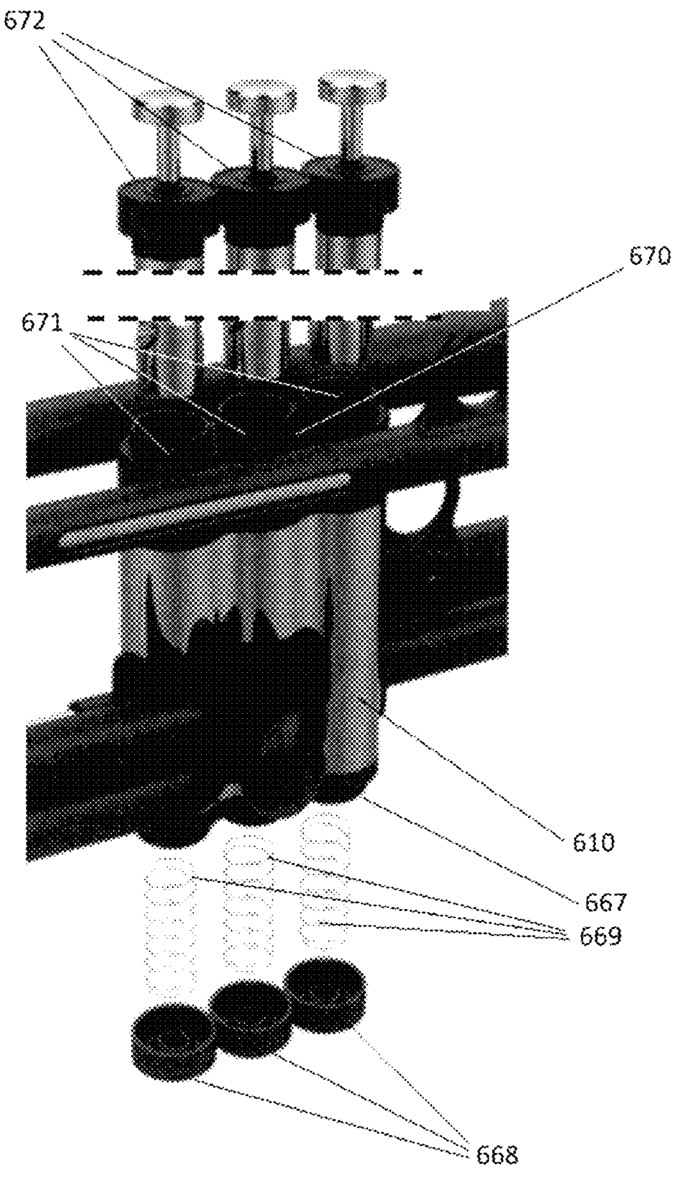
FIG. 6E shows an enlarged partial view of the instrument of FIGS. 6A-6D.

Referring now to FIG. 6E, there is shown an enlarged partial view of the instrument 600 of FIGS. 6A-6D. As is shown, there is provided an upper retaining member 670 which is affixed to the upper end of the valve block 610, preferably by way of fasteners. The upper retaining member 670 is preferably provided as a unitary structure, and is preferably provided in the form of a polymeric material, as is shown in the present embodiment. As will be understood, the upper retaining member 670 may alternatively be comprised of more than one component, and may, in alternative embodiments, be formed from a metal or metal alloy material.

Upper valve caps 672 are provided, similar in function to those as in conventional valve type wind instruments, however, as shown in the present embodiment, the upper valve caps 672 are provided by being formed from a polymeric material. Alternatively, in other embodiments, the upper end caps 672 may be formed from a metal or metal alloy.

In the present embodiment, the valve pistons are identical to each other. However, in contrast to conventional brass instruments, the instrument is configured such that valve pistons can only be affixed in one rotational orientation. In order to achieve this, there are provided locating recesses is 671, which have a corresponding protrusion on the valve piston, such that the valve piston may only be oriented in one rotational aspect.

As will be noted, the locating recesses is 671 corresponding to the first and second valve bores are at the same orientation to each other, whereas the locating recess 671 corresponding to the third valve bore is located approximately a full half turn in relation to those of the 1st and 2nd valve bores.

An advantage as provided by the present invention, by having valve pistons which may be inserted in any of the valve bores, is that young players will not become confused and insert the incorrect valve pistons in the incorrect valve bores.

Furthermore, as is known by those skilled in the art, it is generally possible to insert a valve piston in an incorrect rotational orientation in its correct valve bore. By virtue of having each valve piston only locatable at one specific rotation within its valve bore, this overcomes such a problem often encountered with young players.

There is further provided a lower retaining member 667 which is affixed to the lower end of the valve block 610, preferably by way of fasteners. The lower retaining member 667 is preferably provided as a unitary structure, and may be preferably provided in the form of a polymeric material, as is shown in the present embodiment.

As will be understood, the lower retaining member 667 may alternatively be comprised of more than one component, and may, in alternative embodiments, be formed from a metal or metal alloy material.

Lower valve caps 668 are provided, similar to those as in conventional valve type wind instruments, however, as shown in the present embodiment, the lower valve caps 668 are provided by being formed from a polymeric material. Alternatively, in other embodiments, the lower end cap 668*s* may be formed from a metal or metal alloy.

As is shown, there are provided return springs 669 to urge the pistons in an upwards direction, which are retained within the valve bores between the upper surface of the lower end caps 668, and the lower portion of the valve pistons.

Both the upper end caps 672 and the lower end caps 668 in the present embodiment, lock to the respective retaining members 670 and 667 by a portion of a turn of rotation, and the complementary engagement means between the end caps and the retaining members may be considered similar to a bayonet type engagement mechanism. As such, the problem of cross threading of end caps to valve casings, as is often experienced by younger players, which results in difficulty of repair, is addressed and mitigated by the present invention.

Figure 7A:
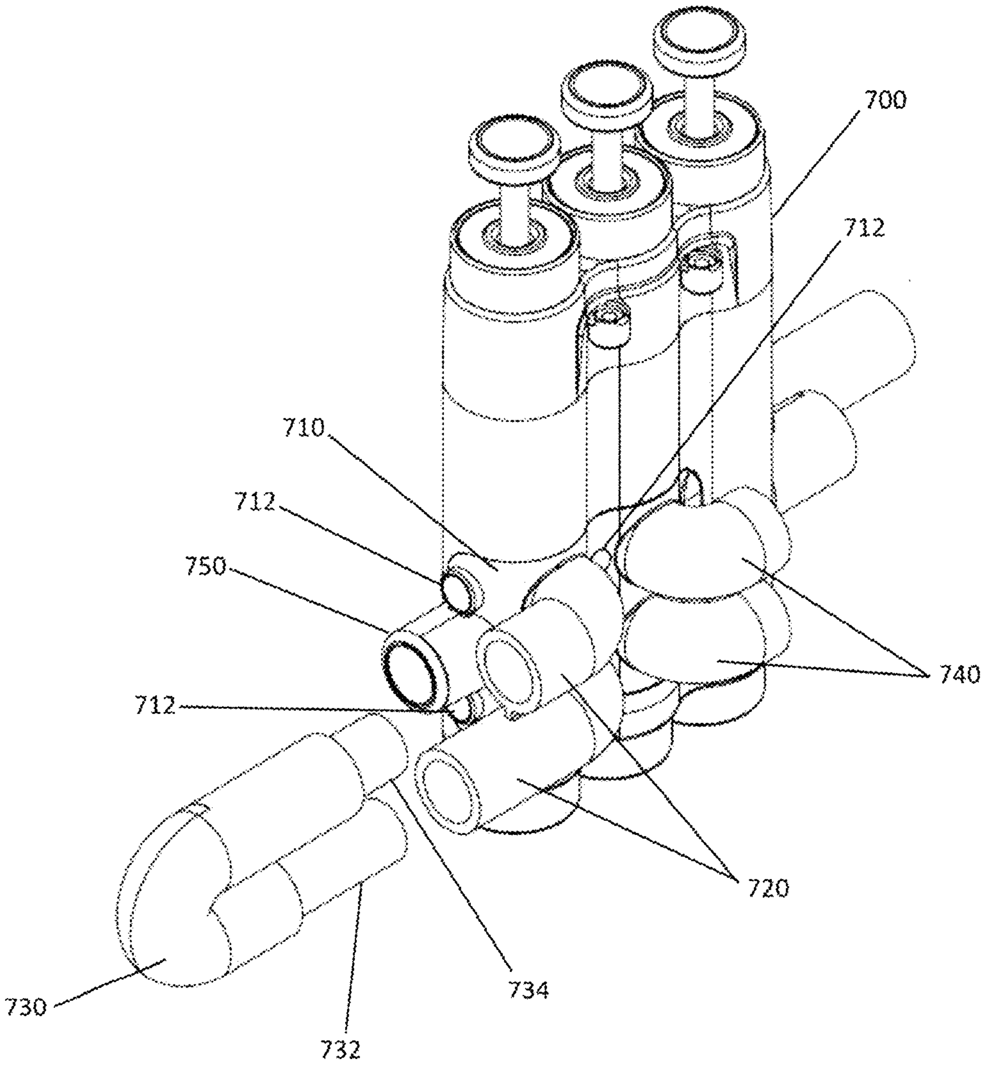
FIG. 7A shows a first perspective line drawing of a portion of the instrument of FIGS. 6A-6D.

Referring to FIG. 7A, a portion of the instrument of FIGS. 6A-6D is shown from the player end, that is the mouthpiece end of the instrument. As is shown, a valve block 700 is provided, which may be considered in keeping with the valve block 200 as described above in reference to FIGS. 2A-2G and the features thereof.

A proximal manifold 710 is provided, which is affixed to the proximal engagement surface valve block 700 by way of screws or fasteners, or by other means, which are located beneath cover caps 712. The manifold is preferably formed from a polymeric material.

A first valve tuning section 730 is provided, which includes metal slide portions 732 and 734 for engagement with ports 720 of the proximal manifold 710. As will be appreciated and understood, slide portion 732 and 734 need not necessarily be formed from the metal material, however, in the present embodiment, a stainless steel material is preferred.

Figure 7B:
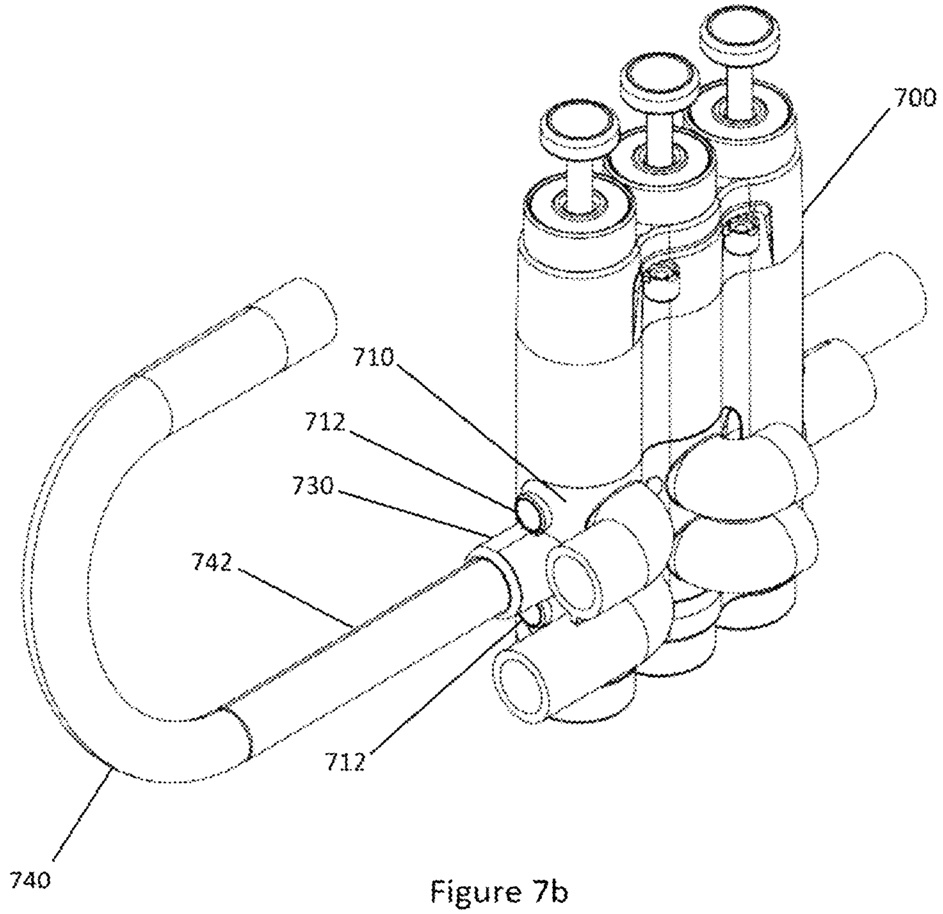
FIG. 7B shows a second perspective line drawing of a portion of the instrument of FIGS. 6A-6D.

Now referring to FIG. 7B, similarly with reference to FIG. 7A, there is shown the portion of the instrument from the player end. Proximal manifold 710 also includes receiving port 750, for receiving the bell pipe 740 of the instrument. In the present embodiment, a portion of the bell pipe 742 is provided in stainless steel material, which inserts into receiving port 750.

The proximal manifold 710 provides fluid communication (i) between the bell pipe 740 and the first valve bore of the valve block 700, (ii) between the first valve tuning section 730 and the first valve bore of the valve block 700 and (iii) between the second valve tuning section 742 and second valve bore of the valve block 700.

Preferably there is a sealing gasket, preferably formed from a silicone material, disposed between the proximal manifold 710 and the proximal engagement surface of the valve block 700.

Figure 7C:
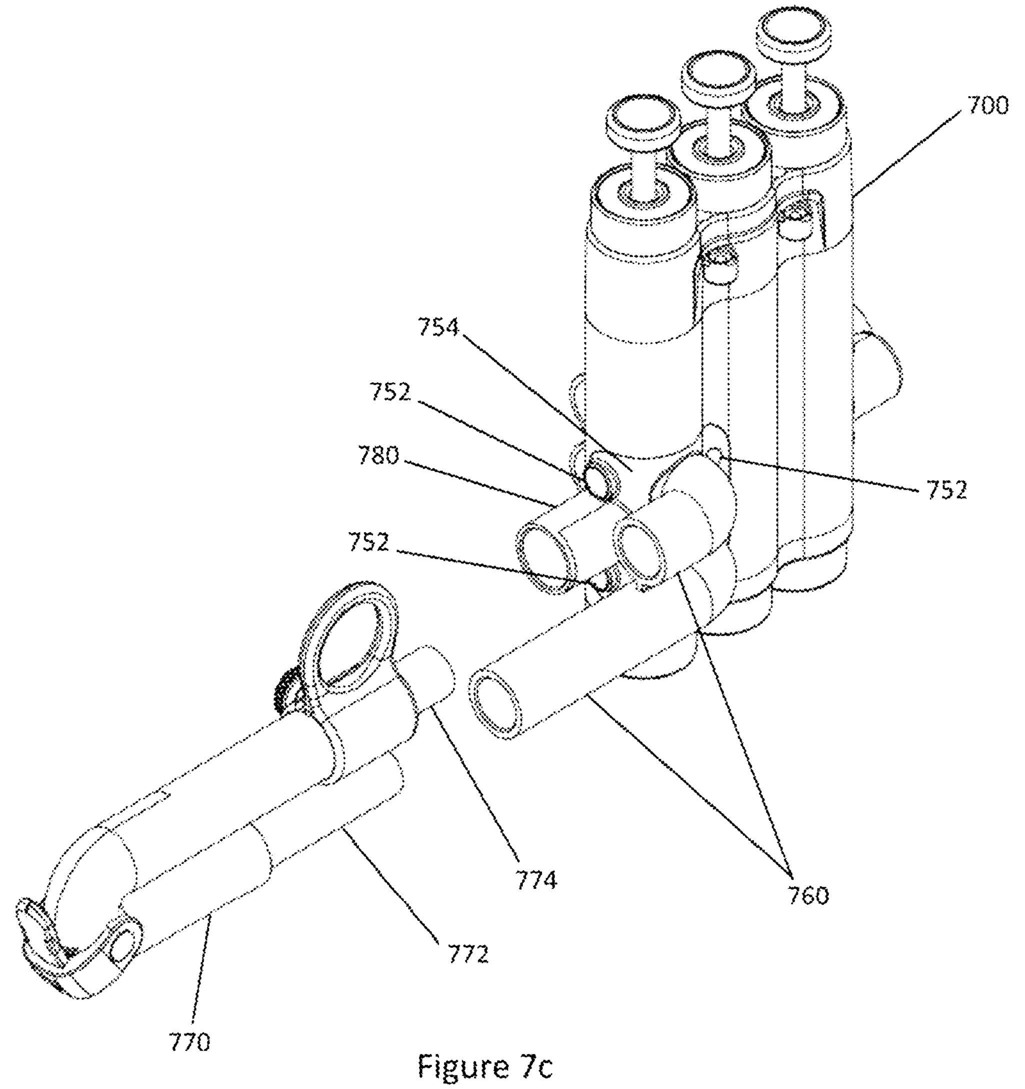
FIG. 7C shows a third perspective line drawing of a portion of the instrument of FIGS. 6A-6D.

Referring now to FIG. 7C, a portion of the instrument of FIG. 6A—6D is shown from the bell and sound output end of the instrument 700. Distal manifold 754, also preferably formed from a polymeric material, is affixed to the valve block 700 again by fasteners or screws or the like, which are covered by sealing caps 752.

Engagement ports 760 are provided on the distal manifold 754 receiving the 3rd valve tuning section 770 which, in the present embodiment, includes stainless steel portions 772 and 774, which are slidingly engaged with the receiving ports 760.

Figure 7D:
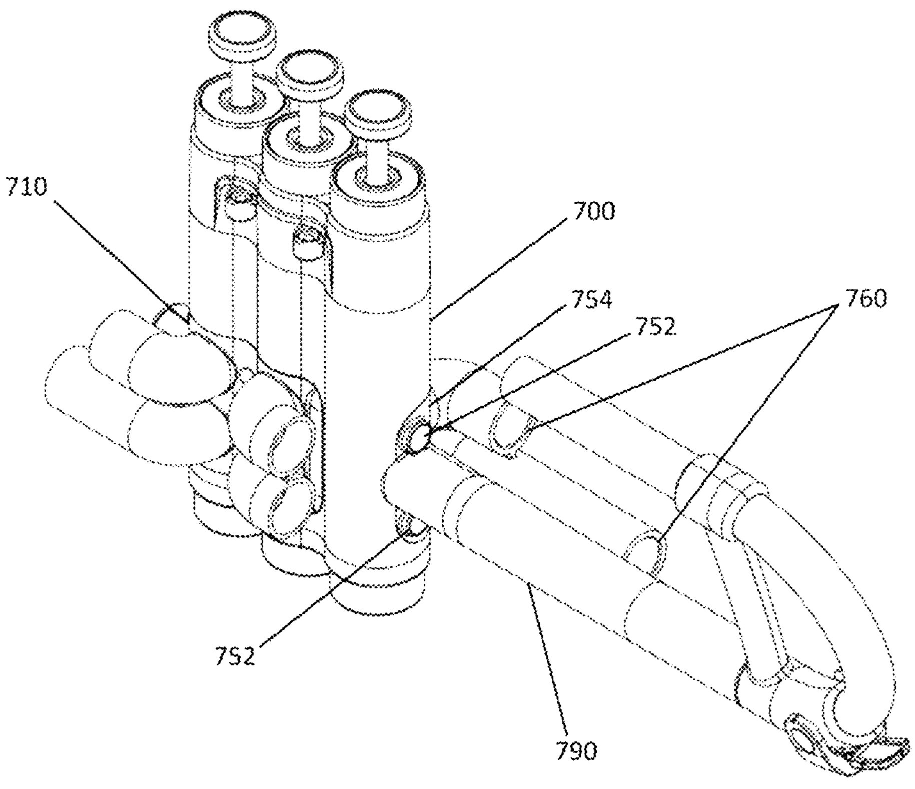
FIG. 7D shows a fourth perspective line drawing of a portion of the instrument of FIGS. 6A-6D.

As is shown in FIG. 7D, the lead pipe 790 is engaged with receiving port 780 of the distal manifold 754 affixed to the distal engagement surface by way of fasteners, to allow ingress of air into the valve block 700 of the instrument. Again, in the present embodiment, there exists a stainless steel or other appropriate metal portion for engagement with receiving port 780.

Figure 7E:
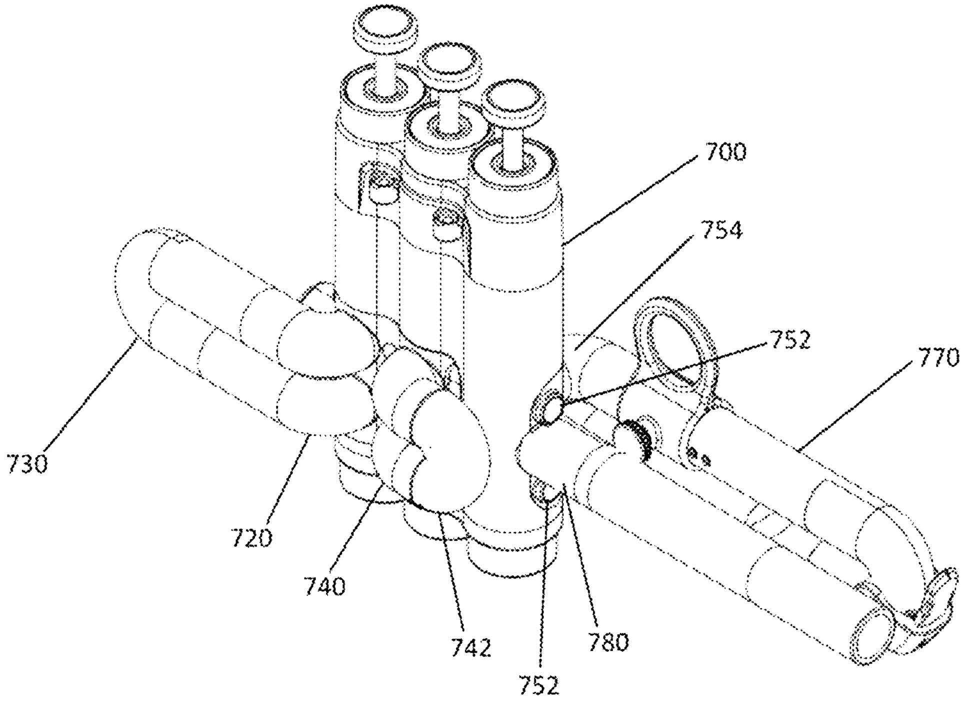
FIG. 7E shows a fifth perspective line drawing of a portion of the instrument of FIGS. 6A-6D.

Now referring to FIG. 7E, as is shown, all three tuning sections, 730 of the first valve, 742 of the second valve and 770 for the third valve as shown as being engaged with the respective receiving ports of the proximal and distal manifolds.

The distal manifold 754 provides fluid communication (i) between the lead pipe 790- and the third valve bore of the valve block 700, and (ii) between the third valve tuning section 770 and the third valve bore of the valve block 700.

Again, preferably there is a sealing gasket, preferably formed from a silicone material, disposed between the distal manifold 754 and the distal engagement surface of the valve block 700.

As will be understood, there are numerous manners in which to engage the tuning sections with the valve block 700 of the present invention, in the present embodiments, by way of integrally formed manifolds and receiving ports, which are understood to not limit the scope of the invention, and any other manner, including direct engagement of tuning sections with the valve block, are considered to fall within the scope of the invention.

Figure 8A:
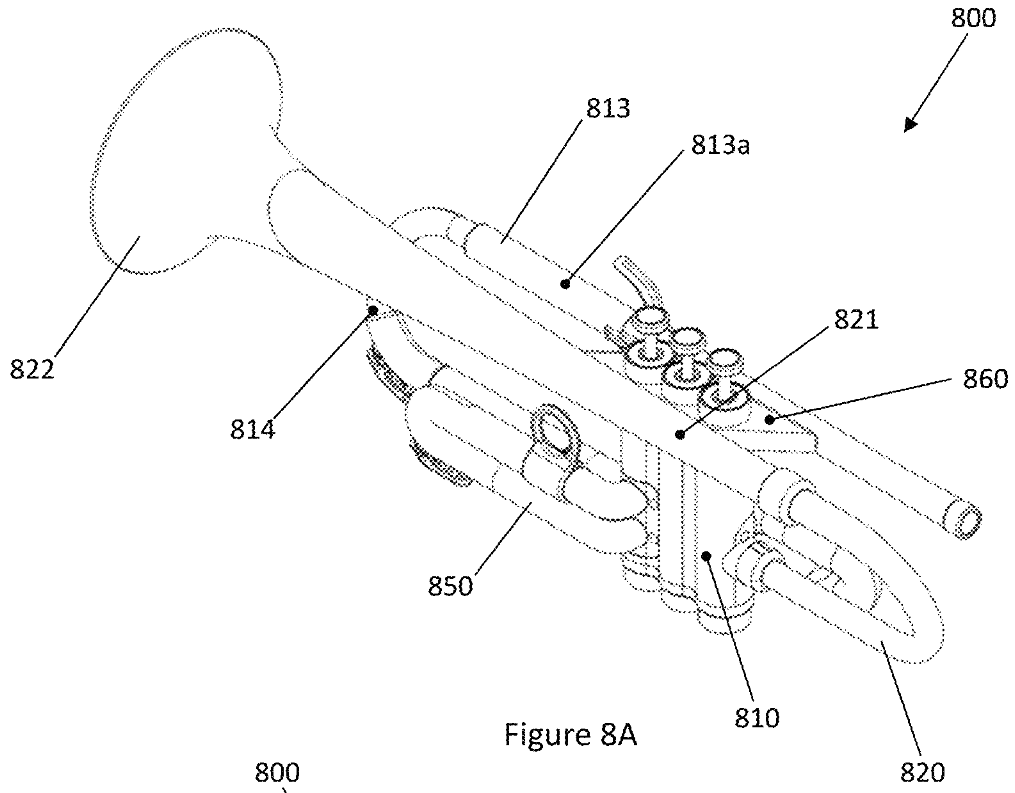
FIG. 8A shows a first perspective view of a further embodiment of a musical instrument, incorporating the valve block according to the present invention.
Figure 8B:
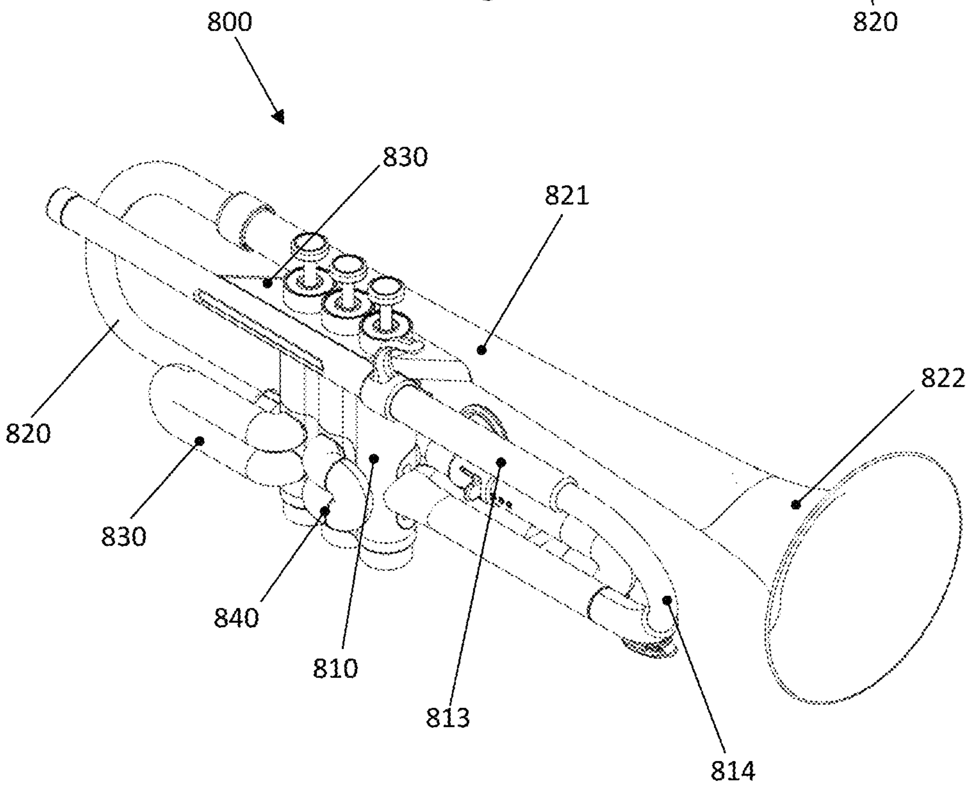
FIG. 8B shows a second perspective view of the further embodiment of the musical instrument of FIG. 8A.

Referring now to FIG. 8A and FIG. 8B, there is shown a further embodiment of a musical instrument 800 incorporating the valve block 810 according to the present invention.

In the present embodiment, the musical instrument is a trumpet 800, which includes the valve block assembly 810 of the present invention. The musical instrument further includes a lead pipe 820, a first valve tuning section 840, a bell 850, a second valve tuning section 870, and a third valve tuning section 880.

Figure 8C:
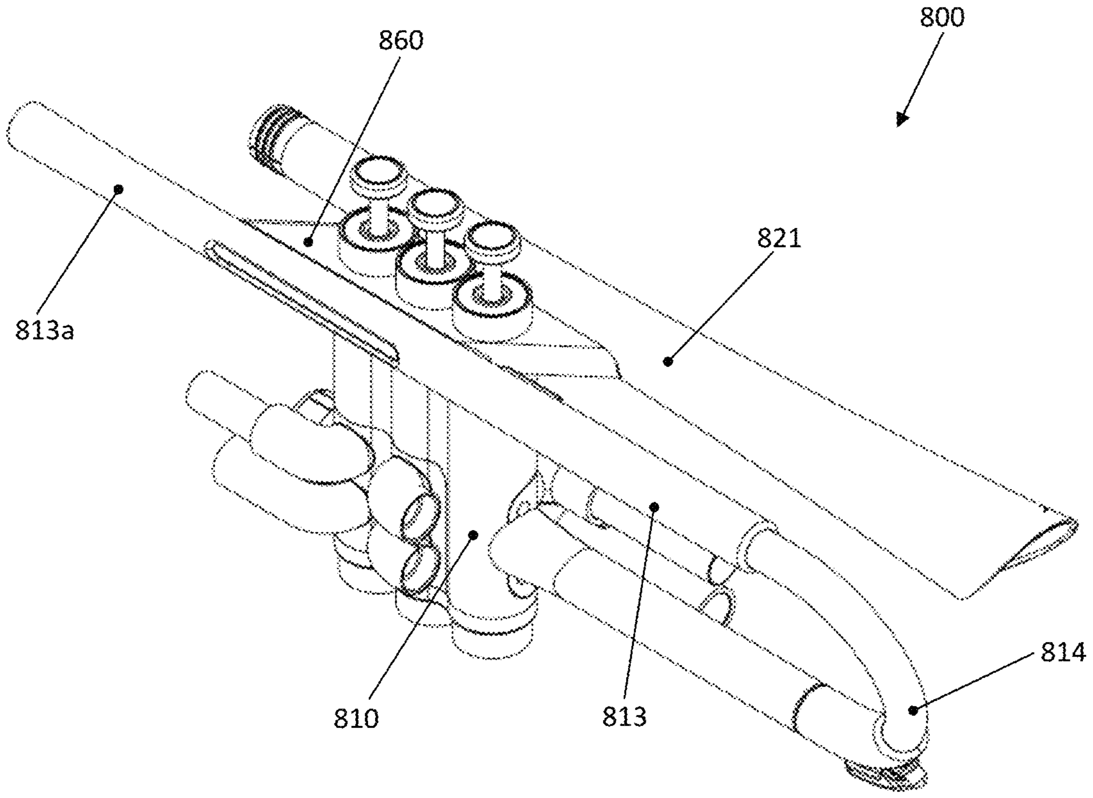
FIG. 8C shows a perspective view of the embodiment of the musical instrument of FIGS. 8A and 8B.

Referring now to FIG. 8C, there is shown a portion of the trumpet of FIGS. 8A and 8B, with the bell removed and a portion of the bell pipe removed as well as the first valve tuning section 840, the second valve tuning section 870, and the third valve tuning section 880 removed, for illustrative purposes in order to demonstrate aspects of the present embodiment.

For comparative purposes, in reference to the embodiment of FIGS. 6A-6E, the lead pipe 613 and the upper bell pipe portion 621 are affixed relative to each other via proximal lead pipe-bell pipe brace 615*a* and distal lead pipe-bell pipe brace 615*b*.

By contrast, in the present embodiment as depicted in FIGS. 8A-8C, there are no distal lead pipe-bell pipe brace braces.

Rather and by contrast, support and bracing between the lead pipe and the bell pipe, is provided by a bracing member 860, which extends between the upper bell pipe 821 and the lead pipe 813.

As will be noted, in the present embodiment, the bracing member 870 also replaces and provides the function of the upper retaining member 670 of the embodiment of FIGS. 6A-6E, whilst also provides for bracing between the lead pipe 813 and the bell pipe 821.

In the present embodiment of FIGS. 8A-8E, the lead pipe portion 613*a*, the bell pipe and the bracing member 860 formed from a polymeric material.

For embodiments of the present invention, such as that as presently depicted and described, the lead pipe portion 613*a*, the bell pipe and the bracing member 860 may be integrally formed from a polymeric material as a monolithic structure.

Such an embodiment offers and affords advantageous from a manufacturing standpoint, as well as provides for ease of assembly. The present inventor has found that, by providing manifolds as an intermediate member between the valve block and tuning sections, lead pipe and bell pipe, in particular when such manifolds are formed from a polymeric material, further reduces damage from impact of the musical instrument with a hard surface, and subsequently and in conjunction with the valve block of the present invention, provides for a robust and sturdy construct, which has substantially increased impact resistance to damage of the valve block a well as the tuning sections.

Furthermore, as the present invention has obviated the use of knuckles, the use of such a manifold also inherently prevents damage to knuckles and denting thereof, in particular when a polymeric manifold is used.

Still further, in the event of damage to the manifold, in the absence of damage to the valve block due to the features of the present invention and for reasons as discussed above, repair of the instrument is relatively straightforward, requiring simply the removal of the manifold, and the fixing of a new manifold to replace the broken or damaged manifold, and possibly a replacement gasket inserted at the time of repair If required or desirable.

As such, the provision of such manifolds, whether formed from a polymeric material, polymer composite material or a metal or metal alloy, and the ease of removal thereof, obviates the necessity to utilize the services of a professional wind instrument repair technician, in the event of damage to that portion of the instrument. The replacement of such a manifold is a relatively straightforward process, and in view of no soldering or brazing being required, and simply removal of fasteners which are fixed the manifold to the instrument, the manifold may be readily removed, and replaced by a person with nominal skills and certainly without the necessity of any skilled technician training or skills as is required for the repair of typical price instruments standard in the art.

Accordingly, this aspect of the present invention provides further advantages, by obviating the necessity of the engagement of the skills and services of a brass musical instrument repair technician, thus providing a wind musical instrument which is economic and easy to repair, and does not require the musical instrument to be delivered and collected from such a repair technician in the event of damage.

The present invention further provides an instrument for which if maintenance and repair is required, is cost effective, and such repair costs can be a small portion of the cost of a replacement instrument, as opposed to repair costs in relation to even entry level brass instruments which, in the event of damage to the instrument, the repair costs can be a significant portion of the cost of the instrument.

Examples of Alternate Embodiments of the Invention

Although the present invention has been described in reference to a trumpet, those skilled in the art will appreciate that the present invention is equally applicable to any type of traditional brass wind instrument, such as a cornet, long cornet, tenor horn, valve-type trombone, horn, French horn, euphonium, and tuba, as well as flugelhorn, tenor horn, baritone horn, euphonium, base, sousaphone, mellophone or the like.

The embodiments as shown, have depicted the valve block as being formed from a metal or metal alloy, such as aluminum. As should be noted and understood, any other metal or metal alloy is equally applicable, for forming the valve block, including polymeric materials, and is considered to fall within the scope of the invention.

Furthermore, although the valve block is depicted as being formed from a single piece of material, as will be appreciated, the valve block may, in alternative embodiments, be formed in two halves and joined together for example, which may include by way of screws or fasteners, adhesives or the like.

In other alternative embodiments, the valve block may be formed from a polymeric material, and be molded to form the geometric requirements of the valve block in accordance with the present invention. In such cases, the valve block may, in some embodiments, be formed in two halves and joined together, for example by way of ultrasonic welding, adhesives, fasteners or the like.

Although the embodiments of the invention depict the musical instrument as a composite between a metal and polymeric material, in other alternative embodiments, the musical instrument may be formed entirely from a metal or metal alloy, and the valve block as provided by the present invention is also applicable to full standard type metal brass wind instruments.

Advantages of the Present Invention

The valve block of the valve assembly of the present invention, does not include spanner braces. Furthermore, the valve block does not include any first connecting knuckle extending between the first valve bore and the second valve bore, or any second connecting knuckle extending between the second valve bore and the third valve bore.

In the absence of any spanner braces and in the absence of any connecting knuckles between the valve bores, the present invention provides for a valve assembly which is immune from damage from impact and compression of any valve casing or portion thereof considered functionally equivalent thereto, by way of spanner braces or connecting knuckles.

As such, the present invention obviates damage to valve casings of valve assemblies of brass instruments, as the solid monolithic valve block does not include elements or components that are the causes of such damage, that is the spanner braces and connecting knuckles. This also obviates damage to the valve piston from such elements.

Furthermore, in embodiments of the invention, as the tuning sections of the first, second and third piston valves include a manifold arrangement, rather than knuckle arrangements soldered or brazed onto valve casings as in the prior art, the present invention also obviates damage to the valve bore as well as damage to the valve pistons.

The present inventor has further identified manufacturing disadvantages of the prior art, and the valve block according to the present invention does not require the step of accurate alignment of three or more valve casings as is required with the prior art, the soldering and brazing of spanner braces, or the alignment and soldering of connecting knuckles between the valve casings, as it does not include valve casings of the prior art but rather bores extending into and at least partially through the monolithic block.

Thus, the present invention provides advantages over of those of the prior art, by ease of assembly and obviating manufacturing steps, which are time-consuming and require skilled craftmanship in order to achieve an appropriate result in the assembly and manufacturing of a brass wind instrument.

Furthermore, in embodiments of the present invention, there is provided ease of repair, whereby tuning sections, lead pipes or bell pipes may be readily removed from the instrument and replaced, without the necessity of soldering or brazing for removal and/or reattachment.

Other advantages of the present invention and embodiments thereof, include ease of cleaning of the sections of the instrument, including the valve bores, and the non-necessity to replace valves in the same valve bore from which they were withdrawn.

The utilization of polymeric materials, particularly as a manifold in embodiments of the invention, which is affixed to the valve block, obviates the problem of knuckles being urged into valve casings, and damage of the valve casing and the valve, as is the problem of the prior art. The present invention may be implemented with appropriate and sufficiently tough and impact resistant polymeric material or composite polymeric material, and furthermore, as in the embodiment utilizing a manifold structure, there is no knuckle portion on the tuning sections and as such, in the absence of a knuckle, damage to the valve bore is obviated.

Further, by providing a unitary-type structure or monolithic structure of the valve block, provides greater strength and increased resilience to impact, as particularly as is required for students and beginners, who often are junior school students, whose instruments are low cost and budget type beginner instruments. Thus, having a strong instrument which is generally of a lower price point for market entry than intermediate of advanced player instrument, which obviates damage and repair as suffered by the prior art, and thus which provides a more cost effective musical instrument due to the significant reduction in repairs and maintenance by musical instrument repair shop and technicians.

Accordingly, the present invention provides a cost effective musical instrument, in particular including the absence and obviation of repair and maintenance associated costs of professional repair services.

Advantageously, embodiments of the present invention also provide for ease of cleaning, and as is known, during the cleaning process in particular at a student level, often an instrument can be dropped, knocked over or impacted upon a hard surface, which causes damage to the instrument by the modes as discussed above. Again, this further provides a cost effective instrument, due to the sturdiness and impact resistance that the present invention provides.

Further, in addition to impact resistance and dent resistance by implementation of manifold components in the instrument, such as the manifolds and bell portion formed from polymeric or polymeric composite materials, in combination with preferably a metal or metal alloy valve block, the present invention can also provide for a reduction in overall mass or weight of the musical instrument, which can be advantageous again for students who may be young players who may suffer from fatigue when holding an instrument for an extended period of time.

Still further, the utilization of stainless steel in embodiments of the present invention, overcomes problems of traditional brass instruments, which are prone to oxidation, in particular in the lead pipe, and any toxic effects thereof. This also provides for increased hygiene by having stainless steel utilized in the air pathway of the instrument.

Within the present invention and specification, the term "tuning assembly" is understood to mean a "valve assembly" of a wind valved instrument in combination with a plurality of "tuning sections" for increasing the overall length of the tube of the instrument.

Further, within the present invention, the term "valve assembly" is understood to mean a combination of valve pistons and the valve piston housings.

Further, the term "valve piston" is understood to include the valve body of both linear operable valves such as are typically implemented in instrument such as trumpets, and to include rotary operable valves such as typically implemented in instruments such as French horns.

As is known in the prior art, such valve piston housings comprised of valve casings, which are typically cylindrical elements formed from a metal or metal alloys such as brass, and which connected to an adjacent casing by way of spanner braces.

By contrast, the valve assembly of the present invention does not include or comprise valve casings, but rather has a monolithic valve casing, which may be considered analogous to an engine block of a motor vehicle.

By providing a valve piston housing in the form of a monolithic block, there is provided a more structurally sound component, which has increased resistance to impact from both spanner braces as well as knuckles for connections with tuning sections, and thus resistance to damage caused by such impact including to the valve housing as well as the valve pistons.

As will be understood, again, although the preferred embodiment as shown in the accompanying drawings and the above description is in reference to a trumpet, it will be understood that the present invention is also equally applicable to any other type of wind valve type instruments, such as cornet, long cornet, tenor horn, valve-type trombone, horn, French horn, euphonium, and tuba, as well as flugelhorn, tenor horn, baritone horn, euphonium, base, sousaphone, mellophone or the like.

Again, also as will be understood, the present invention is also applicable to rotary piston valve bodies, such as those as typically used in French horns, whereby the rotary piston valve body rotates within a cylindrical bore or housing, as well as linear piston valve bodies which move axially in a direction of along the central longitudinal axis and within the valve bore in which they are disposed, such as those as typically used in most instruments such as trumpets and the like.

I claim:

1. A valve block for a valve assembly of a wind musical instrument, said valve block comprising:

a monolithic structure having a plurality of parallel and linearly spaced apart valve bores extending at least partially therethrough and for receiving a corresponding plurality of valve pistons therein;

an air ingress port extending through the valve block from external of the valve block and providing fluid communication between external of the valve block and a first valve bore;

an air outlet port extending through the valve block from external of the valve block and providing fluid communication between external of the valve block and a further valve bore;

transverse connecting passageways for providing fluid communication between adjacent valve bores;

a plurality of pairs of tuning section ports with each pair extending through the valve block from external of the valve block and providing fluid communication between external of the valve block and a valve bore a plurality of threaded mounting holes for affixing a manifold to the valve block;

an engagement surface for engagement with a manifold for providing fluid communication and passage of air from at least one of the pair of tuning section ports, said manifold including a wall plate for engagement with the engagement surface of the valve block having mounting holes extending therethrough, wherein the manifold is affixed to the valve block by a plurality of fasteners extending through said mounting holes in the wall plate and engaged with said plurality of threaded mounting holes, and wherein said at least one manifold includes engagement ports for receiving at least one tuning section.

2. A valve block according to claim 1, wherein said valve bores extend fully through said valve block.

3. A valve block according to claim 2, wherein the valve block includes three valve bores as a first valve bore, a second valve bore and a third valve bore for receiving three corresponding valve pistons therein, and wherein a first transverse passageway extends between the first valve bore and the second valve bore, and a second transverse bore extends between the second valve bore and the third valve bore.

4. A valve block according to claim 1, wherein the valve block includes three valve bores as a first valve bore, a second valve bore and a third valve bore for receiving three corresponding valve pistons therein, and wherein a first transverse passageway extends between the first valve bore and the second valve bore, and a second transverse bore extends between the second valve bore and the third valve bore.

5. A valve block according to claim 4, wherein the air ingress port provides fluid communication between external of the valve block and the third valve bore, and the air outlet port provides fluid communication between external of the valve block and the first valve bore.

6. A valve block according to claim 4, wherein the air ingress port is receiving a vibrating column of air from a lead pipe of a wind musical instrument, the air outlet port is for providing fluid communication with a bell pipe of a wind musical instrument, and the tuning section ports are for providing fluid communication and passage of air through corresponding tuning sections.

7. A valve block according to claim 4, wherein the monolithic structure of the valve block is formed from a metal or a metal alloy.

8. A valve block according to claim 4, wherein the monolithic structure of the valve block is formed from aluminum or an aluminum alloy.

9. A valve block according to claim 4, wherein the valve block is formed from a polymeric material.

10. A valve block according to claim 1, wherein the monolithic structure of the valve block is formed from aluminum or an aluminum alloy.

11. A valve block according to claim 1, wherein the valve block is formed from a polymeric material.

12. A valve block according to claim 1, wherein a central axis of the air ingress port and a central axis of the air outlet port are coaxial and colinear.

13. A valve block according to claim 1, wherein a central axis of the air ingress port and, a central axis of the outlet port and said transverse connecting passageways are coaxial and colinear along a longitudinal midplane extending through central axes of said plurality of valve bores.

14. A valve block according to claim 1, wherein the air ingress port is receiving a vibrating column of air from a lead pipe of a wind musical instrument, the air outlet port is for providing fluid communication with a bell pipe of a wind musical instrument, and the tuning section ports are for providing fluid communication and passage of air through corresponding tuning sections.

15. A wind musical instrument having a player end and a sound output end, comprising:

a valve block comprising a monolithic structure having a plurality of parallel and linearly spaced apart valve bores extending at least partially therethrough and for receiving a corresponding plurality of valve pistons therein;

an air ingress port extending through the valve block from external of the valve block and providing fluid communication between external of the valve block and a first valve bore;

an air outlet port extending through the valve block from external of the valve block and providing fluid communication between external of the valve block and a further valve bore;

transverse connecting passageways for providing fluid communication between adjacent valve bores; and a plurality of pairs of tuning section ports with each pair extending through the valve block from external of the valve block and providing fluid communication between external of the valve block and a valve bore;

wherein the valve block further comprises an engagement surface for engagement with at least one manifold for providing fluid communication and passage of air from at least one of the pair of tuning section ports; and wherein said manifold includes a plurality of threaded mounting holes for affixing said at least one manifold to the valve block;

a plurality of valve pistons, each of which is disposed at least partially within a valve bore of said valve block;

a lead pipe in fluid communication with the air ingress port of said valve block;

a bell pipe in fluid communication with the air outlet port;

a tuning section in fluid communication with each pair of tuning section ports; and at least one manifold affixed to said valve block, wherein said at least one manifold includes a wall plate for engagement with the engagement surface of the valve block having mounting holes extending therethrough, wherein said at least one manifold is affixed to the valve block by a plurality of fasteners extending through said mounting holes in the wall plate and engaged with said plurality of threaded mounting holes, and wherein said at least one manifold includes engagement ports for receiving at least one tuning section.

16. A wind musical instrument according to claim 15, further comprising a distal manifold disposed between the valve block and the lead pipe and disposed towards the sound output end of the wind musical instrument, and a proximal manifold disposed between the valve block and the lead pipe and disposed towards the player end of the musical instrument.

17. A wind musical instrument, according to claim 16, wherein the distal manifold is further disposed between a third bore tuning section port and a corresponding tuning section, and the proximal manifold is disposed between a first and a second bore tuning section port and the corresponding tuning sections.

18. A wind musical instrument according to claim 15, wherein the monolithic structure of the valve block is formed from aluminum or an aluminum alloy.

19. A wind musical instrument according to claim 15, wherein the valve block is formed from a polymeric material.

* * * * *